United States Patent
Kunz et al.

(10) Patent No.: US 10,513,350 B1
(45) Date of Patent: Dec. 24, 2019

(54) CAPTURE DEVICES FOR UNMANNED AERIAL, VEHICLES, INCLUDING TRACK-BORNE CAPTURE LINES, AND ASSOCIATED SYSTEMS AND METHODS

(71) Applicant: Insitu, Inc., Bingen, WA (US)

(72) Inventors: Peter Kunz, Hood River, OR (US); Clifford Jackson, White Salmon, WA (US); Craig Aram Thomasian, The Dalles, WA (US)

(73) Assignee: INSITU, INC., Bingen, WA (US)

( * ) Notice: Subject to any disclaimer, the term of this patent is extended or adjusted under 35 U.S.C. 154(b) by 0 days.

(21) Appl. No.: 15/892,701

(22) Filed: Feb. 9, 2018

Related U.S. Application Data

(62) Division of application No. 14/939,893, filed on Nov. 12, 2015, now Pat. No. 9,896,222.

(60) Provisional application No. 62/082,471, filed on Nov. 20, 2014.

(51) Int. Cl.
*B64F 1/02* (2006.01)

(52) U.S. Cl.
CPC .................................... *B64F 1/02* (2013.01)

(58) Field of Classification Search
CPC ...... B64C 2201/182; B64C 25/68; B64F 1/02
See application file for complete search history.

(56) References Cited

U.S. PATENT DOCUMENTS

| | | | |
|---|---|---|---|
| 965,881 A | 8/1910 | Draper | |
| 968,339 A | 8/1910 | Geraldson | |
| 975,953 A | 11/1910 | Hourwich | |
| 1,144,505 A * | 6/1915 | Steffan | B64F 1/06 244/110 F |
| 1,164,967 A | 12/1915 | Thorp | |
| 1,317,631 A | 9/1919 | Kinser | |
| 1,383,595 A | 7/1921 | Black | |
| 1,384,036 A | 7/1921 | Anderson | |
| 1,428,163 A | 9/1922 | Harriss | |
| 1,499,472 A | 7/1924 | Hazen | |
| 1,530,010 A | 3/1925 | Neilson | |

(Continued)

FOREIGN PATENT DOCUMENTS

| | | |
|---|---|---|
| CN | 1032645 A | 5/1989 |
| CN | 101549754 | 10/2009 |

(Continued)

OTHER PUBLICATIONS

Ames Builds Advanced Yawed-Wing RPV, Aviation Week and Space Technology, Jan. 22, 1973, p. 73.

(Continued)

*Primary Examiner* — Richard G Davis
(74) *Attorney, Agent, or Firm* — Hanley, Flight & Zimmerman, LLC

(57) ABSTRACT

Capture devices for unmanned aerial vehicles, including track borne capture lines, and associated systems and methods are disclosed. A representative system includes at least one support having an upright portion and at least one boom portion, a carriage track carried by the at least one boom portion, and a carriage carried by, and movable along, the carriage track. The system can further include a capture line carried by and extending downwardly from the at least one boom portion, or the carriage, or both the at least one boom portion and the carriage.

12 Claims, 27 Drawing Sheets

(56) References Cited

U.S. PATENT DOCUMENTS

| | | |
|---|---|---|
| 1,532,736 A | 4/1925 | Dodds |
| 1,556,348 A | 10/1925 | Ray et al. |
| 1,624,188 A | 4/1927 | Simon |
| RE16,613 E | 5/1927 | Moody et al. |
| 1,634,964 A | 7/1927 | Steinmetz |
| 1,680,473 A | 8/1928 | Parker |
| 1,686,298 A | 10/1928 | Uhl |
| 1,712,164 A | 5/1929 | Peppin |
| 1,716,670 A | 6/1929 | Sperry |
| 1,731,091 A | 10/1929 | Belleville |
| 1,737,483 A | 11/1929 | Verret |
| 1,738,261 A | 12/1929 | Perkins |
| 1,748,663 A | 2/1930 | Tucker |
| 1,749,769 A | 3/1930 | Johnson |
| 1,756,747 A | 4/1930 | Holland |
| 1,777,167 A | 9/1930 | Forbes |
| 1,816,976 A | 8/1931 | Kirkham |
| 1,825,578 A | 9/1931 | Cernuda |
| 1,836,010 A | 12/1931 | Audrain |
| 1,842,432 A | 1/1932 | Stanton |
| 1,869,506 A | 8/1932 | Richardson |
| 1,892,357 A | 12/1932 | Moe |
| 1,909,445 A | 5/1933 | Ahola |
| 1,912,723 A | 6/1933 | Perkins |
| 1,925,212 A | 9/1933 | Steiber |
| 1,940,030 A | 12/1933 | Steiber |
| 1,960,264 A | 5/1934 | Heinkel |
| 2,211,089 A | 8/1940 | Berlin |
| 2,286,381 A | 6/1942 | Rubissow |
| 2,296,988 A | 9/1942 | Endter |
| 2,333,559 A | 11/1943 | Grady et al. |
| 2,342,773 A | 2/1944 | Wellman |
| 2,347,561 A | 4/1944 | Howard et al. |
| 2,360,220 A | 10/1944 | Goldman |
| 2,364,527 A | 12/1944 | Haygood |
| 2,365,778 A | 12/1944 | Schwab |
| 2,365,827 A | 12/1944 | Liebert |
| 2,380,702 A | 7/1945 | Persons |
| 2,390,754 A | 12/1945 | Valdene |
| 2,401,853 A | 6/1946 | Bailey |
| 2,435,197 A | 2/1948 | Brodie |
| 2,436,240 A | 2/1948 | Wertz |
| 2,447,945 A | 8/1948 | Knowler et al. |
| 2,448,209 A | 8/1948 | Boyer et al. |
| 2,465,936 A | 3/1949 | Schultz |
| 2,488,050 A | 11/1949 | Brodie |
| 2,488,051 A | 11/1949 | Brodie |
| 2,515,205 A | 7/1950 | Fieux |
| 2,526,348 A | 10/1950 | Gouge |
| 2,669,403 A | 2/1954 | Milligan |
| 2,671,938 A | 3/1954 | Roberts |
| 2,735,391 A | 2/1956 | Buschers |
| 2,787,185 A | 4/1957 | Rea et al. |
| 2,814,453 A | 11/1957 | Trimble et al. |
| 2,843,342 A | 7/1958 | Ward |
| 2,844,340 A | 7/1958 | Daniels et al. |
| 2,908,240 A | 10/1959 | Hodge |
| 2,919,871 A | 1/1960 | Sorensen |
| 2,933,183 A | 4/1960 | Koelsch |
| 2,937,827 A | 5/1960 | Duce |
| 2,954,946 A | 10/1960 | O'Neil et al. |
| 3,069,118 A | 12/1962 | Bernard |
| RE25,406 E | 6/1963 | Byrne et al. |
| 3,163,380 A | 12/1964 | Brodie |
| 3,268,090 A | 8/1966 | Wirkkala |
| 3,411,398 A | 11/1968 | Blakeley et al. |
| 3,454,244 A | 7/1969 | Walander |
| 3,468,500 A | 9/1969 | Carlsson |
| 3,484,061 A | 12/1969 | Niemkiewicz |
| 3,512,447 A | 5/1970 | Vaughn |
| 3,516,626 A | 6/1970 | Strance et al. |
| 3,589,651 A | 6/1971 | Niemkiewicz et al. |
| 3,657,956 A | 4/1972 | Bradley et al. |
| 3,672,214 A | 6/1972 | Yasuda |
| 3,684,219 A | 8/1972 | King |
| 3,708,200 A | 1/1973 | Richards |
| 3,765,625 A | 10/1973 | Myhr et al. |
| 3,771,484 A | 11/1973 | Schott et al. |
| 3,827,660 A | 8/1974 | Doolittle |
| 3,939,988 A | 2/1976 | Wellman et al. |
| 3,943,657 A | 3/1976 | Leckie et al. |
| 3,980,259 A | 9/1976 | Greenhalgh et al. |
| 3,989,206 A | 11/1976 | Gregory |
| 4,037,807 A | 7/1977 | Johnston |
| 4,067,139 A | 1/1978 | Pinkerton et al. |
| 4,079,901 A | 3/1978 | Mayhew et al. |
| 4,143,840 A | 3/1979 | Bernard et al. |
| 4,149,840 A | 3/1979 | Tippmann |
| 4,147,317 A | 4/1979 | Mayhew et al. |
| D256,816 S | 9/1980 | McMahon et al. |
| 4,236,686 A | 12/1980 | Barthelme et al. |
| 4,238,093 A | 12/1980 | Siegel et al. |
| 4,267,987 A | 5/1981 | McDonnell |
| 4,279,195 A | 7/1981 | Miller |
| 4,296,894 A | 10/1981 | Schnabele et al. |
| 4,296,898 A | 10/1981 | Watson |
| 4,311,290 A | 1/1982 | Koper |
| 4,372,016 A | 2/1983 | LaViolette et al. |
| 4,408,737 A | 10/1983 | Schwaerzler et al. |
| 4,410,151 A | 10/1983 | Hoppner et al. |
| 4,457,479 A | 7/1984 | Daude et al. |
| 4,471,923 A | 9/1984 | Hoppner et al. |
| 4,523,729 A | 6/1985 | Frick et al. |
| 4,566,658 A | 1/1986 | DiGiovanniantonio et al. |
| 4,645,142 A | 2/1987 | Soelter |
| 4,653,706 A | 3/1987 | Ragiab |
| 4,678,143 A | 7/1987 | Griffin et al. |
| 4,730,793 A | 3/1988 | Thurber, Jr. et al. |
| 4,753,400 A | 6/1988 | Reuter et al. |
| 4,790,497 A | 12/1988 | Yoffe et al. |
| 4,809,933 A | 3/1989 | Buzby et al. |
| 4,842,222 A | 6/1989 | Baird et al. |
| 4,909,458 A | 3/1990 | Martin et al. |
| 4,979,701 A | 12/1990 | Colarik et al. |
| 4,991,739 A | 2/1991 | Levasseur |
| 5,007,875 A | 4/1991 | Dasa |
| 5,039,034 A | 8/1991 | Burgess et al. |
| 5,042,750 A | 8/1991 | Winter |
| 5,054,717 A | 10/1991 | Taylor et al. |
| 5,060,888 A | 10/1991 | Vezain et al. |
| 5,109,788 A | 5/1992 | Heinzmann et al. |
| 5,119,935 A | 6/1992 | Stump et al. |
| 5,145,129 A | 9/1992 | Gebhard |
| 5,176,339 A | 1/1993 | Schmidt |
| 5,222,694 A | 6/1993 | Smoot |
| 5,253,605 A | 10/1993 | Collins |
| 5,253,606 A | 10/1993 | Ortelli et al. |
| 5,259,574 A | 11/1993 | Carrot |
| 5,378,851 A | 1/1995 | Brooke et al. |
| 5,390,550 A | 2/1995 | Miller |
| 5,407,153 A | 4/1995 | Kirk et al. |
| 5,509,624 A | 4/1996 | Takahashi et al. |
| 5,583,311 A | 12/1996 | Rieger et al. |
| 5,603,592 A | 2/1997 | Sadri et al. |
| 5,655,944 A | 8/1997 | Fusselman |
| 5,687,930 A | 11/1997 | Wagner et al. |
| 5,762,456 A | 6/1998 | Aasgaard |
| 5,816,761 A | 10/1998 | Cassatt et al. |
| 5,906,336 A | 5/1999 | Eckstein |
| 5,913,479 A | 6/1999 | Westwood, III |
| 6,161,797 A | 12/2000 | Kirk et al. |
| 6,237,875 B1 | 5/2001 | Menne et al. |
| 6,264,140 B1 * | 7/2001 | McGeer ............... B64C 25/68 244/110 C |
| 6,343,768 B1 | 2/2002 | Muldoon et al. |
| 6,370,455 B1 | 4/2002 | Larson et al. |
| 6,371,410 B1 | 4/2002 | Cairo-Iocco et al. |
| 6,416,019 B1 | 7/2002 | Hilliard et al. |
| 6,442,460 B1 | 8/2002 | Larson et al. |
| 6,457,673 B1 | 10/2002 | Miller |
| 6,478,650 B1 | 11/2002 | Tsai et al. |
| 6,626,077 B1 | 9/2003 | Gilbert |
| 6,695,255 B1 | 2/2004 | Husain |

(56) References Cited

U.S. PATENT DOCUMENTS

| | | | |
|---|---|---|---|
| 6,758,440 B1 * | 7/2004 | Repp | B64F 1/02 244/110 C |
| 6,772,488 B1 | 8/2004 | Jensen et al. | |
| 6,835,045 B1 | 12/2004 | Barbee et al. | |
| 6,874,729 B1 | 4/2005 | McDonnell | |
| 6,925,690 B2 | 8/2005 | Sievers | |
| 7,114,680 B2 | 2/2006 | Dennis | |
| 7,059,564 B2 | 6/2006 | Dennis | |
| 7,066,430 B2 | 6/2006 | Dennis et al. | |
| 7,090,166 B2 | 8/2006 | Dennis et al. | |
| 7,121,507 B2 | 10/2006 | Dennis et al. | |
| 7,128,294 B2 | 10/2006 | Roeseler et al. | |
| 7,140,575 B2 | 11/2006 | McGeer et al. | |
| 7,143,974 B2 | 12/2006 | Roeseler et al. | |
| 7,152,827 B2 | 12/2006 | McGeer | |
| 7,155,322 B2 | 12/2006 | Nakahara et al. | |
| 7,165,745 B2 | 1/2007 | McGeer et al. | |
| 7,175,135 B2 | 2/2007 | Dennis et al. | |
| 7,219,856 B2 | 5/2007 | Watts et al. | |
| 7,259,357 B2 | 8/2007 | Walker | |
| 7,264,204 B1 | 9/2007 | Portmann | |
| 7,410,125 B2 | 8/2008 | Steele | |
| 7,422,178 B2 | 9/2008 | DeLaune | |
| 7,472,461 B2 | 1/2009 | Anstee | |
| 7,510,145 B2 | 3/2009 | Snediker | |
| 7,578,467 B2 | 8/2009 | Goodrich | |
| 7,686,247 B1 | 3/2010 | Monson et al. | |
| 7,740,210 B2 | 6/2010 | Pilon et al. | |
| 7,748,661 B2 | 7/2010 | Harris et al. | |
| 7,798,445 B2 | 9/2010 | Heppe et al. | |
| 7,806,366 B2 | 10/2010 | Jackson | |
| 8,016,073 B2 | 9/2011 | Petzel | |
| 8,028,952 B2 | 10/2011 | Urnes, Sr. | |
| 8,038,090 B2 | 10/2011 | Wilson | |
| 8,136,766 B2 | 3/2012 | Dennis | |
| 8,172,177 B2 | 5/2012 | Lovell et al. | |
| 8,205,537 B1 | 6/2012 | Dupont | |
| 8,313,057 B2 | 11/2012 | Rednikov | |
| 8,348,714 B2 | 1/2013 | Newton | |
| 8,387,540 B2 | 3/2013 | Merems | |
| 8,683,770 B2 | 4/2014 | diGirolamo et al. | |
| 8,820,698 B2 | 9/2014 | Balfour et al. | |
| 8,944,373 B2 | 2/2015 | Dickson et al. | |
| 8,950,124 B2 | 2/2015 | Wellershoff | |
| 9,085,362 B1 | 7/2015 | Kilian et al. | |
| 9,266,610 B2 | 2/2016 | Knapp | |
| 9,340,301 B2 | 5/2016 | Dickson et al. | |
| 9,359,075 B1 | 6/2016 | von Flotow et al. | |
| 9,896,222 B2 | 2/2018 | Kunz | |
| 9,932,110 B2 | 4/2018 | McNally | |
| 2002/0011223 A1 | 1/2002 | Zauner et al. | |
| 2002/0049447 A1 | 4/2002 | Li | |
| 2002/0100838 A1 | 8/2002 | McGeer et al. | |
| 2003/0116107 A1 | 6/2003 | Laimbock | |
| 2003/0122384 A1 | 7/2003 | Swanson et al. | |
| 2003/0202861 A1 | 10/2003 | Nelson | |
| 2003/0222173 A1 | 12/2003 | McGeer et al. | |
| 2004/0129833 A1 | 7/2004 | Perlo et al. | |
| 2004/0232282 A1 | 11/2004 | Dennis | |
| 2005/0132923 A1 | 6/2005 | Lloyd | |
| 2005/0187677 A1 | 8/2005 | Walker | |
| 2006/0006281 A1 | 1/2006 | Sirkis | |
| 2006/0091258 A1 | 5/2006 | Chiu et al. | |
| 2006/0102783 A1 * | 5/2006 | Dennis | B64C 39/024 244/110 F |
| 2006/0249623 A1 | 11/2006 | Steele | |
| 2006/0271251 A1 | 11/2006 | Hopkins | |
| 2007/0023582 A1 | 2/2007 | Steele et al. | |
| 2007/0051849 A1 * | 3/2007 | Watts | B64F 1/02 244/110 F |
| 2007/0158498 A1 | 7/2007 | Snediker | |
| 2007/0200027 A1 | 8/2007 | Johnson | |
| 2007/0252034 A1 | 11/2007 | McGeer et al. | |
| 2007/0261542 A1 | 11/2007 | Chang et al. | |
| 2008/0156932 A1 | 7/2008 | McGeer et al. | |
| 2008/0191091 A1 | 8/2008 | Hoisington et al. | |
| 2009/0114761 A1 | 5/2009 | Sells | |
| 2009/0191019 A1 | 7/2009 | Billings | |
| 2009/0194638 A1 | 8/2009 | Dennis | |
| 2009/0224097 A1 * | 9/2009 | Kariv | B64F 1/02 244/63 |
| 2009/0236470 A1 | 9/2009 | Goossen | |
| 2009/0294584 A1 | 12/2009 | Lovell et al. | |
| 2010/0181424 A1 | 7/2010 | Goossen | |
| 2010/0237183 A1 | 9/2010 | Wilson et al. | |
| 2010/0243799 A1 | 9/2010 | Al-Qaffas | |
| 2010/0318475 A1 | 12/2010 | Abrahamson | |
| 2012/0210853 A1 | 8/2012 | Abershitz | |
| 2012/0223182 A1 | 9/2012 | Gilchrist, III et al. | |
| 2013/0082137 A1 | 4/2013 | Gundlach et al. | |
| 2014/0077028 A1 | 3/2014 | McGeer et al. | |
| 2015/0129716 A1 | 5/2015 | Yoffe | |
| 2015/0166177 A1 | 6/2015 | Bernhardt | |
| 2016/0114906 A1 | 4/2016 | McGeer | |
| 2016/0137311 A1 | 5/2016 | Peverill et al. | |
| 2016/0144980 A1 | 5/2016 | Kunz et al. | |
| 2016/0152339 A1 | 6/2016 | von Flowtow | |
| 2016/0264259 A1 | 9/2016 | Dickson et al. | |
| 2016/0327945 A1 | 11/2016 | Davidson | |
| 2016/0375981 A1 | 12/2016 | McDonnell | |
| 2017/0225784 A1 | 8/2017 | Kunz et al. | |
| 2017/0369185 A1 | 12/2017 | Grub | |
| 2018/0162528 A1 | 6/2018 | McGrew et al. | |

FOREIGN PATENT DOCUMENTS

| | | |
|---|---|---|
| CN | 102384702 | 3/2012 |
| DE | 4301671 A1 | 7/1993 |
| DE | 19602703 A1 | 2/1997 |
| DE | 102010010508 | 9/2011 |
| EP | 0742366 A1 | 11/1996 |
| FR | 854371 | 4/1940 |
| GB | 1445153 | 8/1976 |
| GB | 2 080 216 A | 2/1982 |
| GB | 2093414 A | 9/1982 |
| GB | 2 150 895 A | 7/1985 |
| GB | 2 219 777 A | 12/1989 |
| GB | 2231011 A | 11/1990 |
| IL | 76726 | 1/1991 |
| JP | 07-304498 | 11/1995 |
| JP | 2008540217 A | 11/2008 |
| WO | WO-00/75014 A1 | 12/2000 |
| WO | WO-01/07318 A1 | 2/2001 |
| WO | WO-2008015663 A1 | 2/2008 |
| WO | WO-2011066400 | 6/2011 |
| WO | WO-2012047677 | 4/2012 |
| WO | WO-2014080386 | 5/2014 |

OTHER PUBLICATIONS

Gross, Jon L., Investigation of Lift, Drag, and Aerodynamic Pitching Moment During In-Flight Recovery of a Remotely Piloted Vehicle, Air Force Institute of Technology, NTIS, Sep. 1973, 99 pages.

Plane Talk, The Newsletter of the War Eagles Air Museum, www.war-eagles-air-museum.com vol. 25, No. 1, First Quarter Jan.-Mar. 2012,8 pages.

Galinski et al., "Results of the Gust Resistant MAV Programme," 28th International Congress of the Aeronautical Sciences, 2012, 10 pages.

Communication pursuant to Article 94(3) EPC for European Patent Application No. 15195677.8, Applicant: Insitu, Inc., dated May 11, 2018, 5 pages.

Article: Robinson: R. Robinson, "Dynamic ; Analysis of a Carousel Remotely Piloted ; Vehicle Recovery System," 1977, Naval ; Post-Graduate School Master's Thesis, ; No. ADA052401.

Article: Stephen A. Whitmore, Mike Fife, and ; Logan Brashear: "Development of a Closed-Loop ; Strap Down Attitude System for an Ultrahigh Altitude ; Flight Experiment," Jan. 1997, NASA Technical Memorandum 4775.

(56) References Cited

OTHER PUBLICATIONS

Dorr, Robert F., "The XF-85 Goblin," http://www.defensemedianetwork.com/stories/the-xf-85-goblin-the-parasite-fighter-that-didnt-work/, DefenseMediaNetwork, Sep. 11, 2014.

Hunton, Lynn W. and James, Harry A., NACA Resesarch Memorandum for the Air Material Command, U.S. Air Force, "An Investigation of the McDonnell XP-85 Airplane in the Ames 40 by 80 Foot Wind Tunnel—Force and Moment Tests," National Advisory Committee for Aeronautics, Sep. 27, 1948, 155 pages.

Phillips, K.; "Alternate Aquila Recovery System Demonstration Recovery System Flight Test," Final Report; Jan. 19, 1977; 67 pages.

Study: US Army: H. E. Dickard, "Mini-RPV ; Recovery System Conceptual Study,"; Aug. 1977, Contract DA4J02-76-C-0048, ; Report No. USAAMRDL-TR077-24.

U.S. Appl. No. 15/638,137, filed Jun. 29, 2017, Leon.

U.S. Appl. No. 15/892,701, filed Feb. 9, 2018, Kunz et al.

State Intellectual Property Office of PRC, "Notification of First Office Action," issued in connection with Chinese Patent Application No. 201510808385, dated May 22, 2019, 11 pages.

European Patent Office, "Extended European Search Report," issued in connection with European Patent Application No. 19170960.9, dated Aug. 9, 2019, 6 pages.

\* cited by examiner

CAPTURE DEVICES FOR UNMANNED AERIAL, VEHICLES, INCLUDING TRACK-BORNE CAPTURE LINES, AND ASSOCIATED SYSTEMS AND METHODS

CROSS-REFERENCE TO RELATED APPLICATION

The present application claims priority to U.S. Provisional Application No. 62/082,471, filed on Nov. 20, 2014, and incorporated herein by reference.

TECHNICAL FIELD

The present disclosure is directed generally to capture devices for unmanned aerial vehicles, including carriage-borne capture lines, and associated systems and methods.

BACKGROUND

Unmanned aircraft or aerial vehicles (UAVs) provide enhanced and economical access to areas where manned flight operations are unacceptably costly and/or dangerous. For example, unmanned aircraft outfitted with remotely controlled cameras can perform a wide variety of surveillance missions, including spotting schools of fish for the fisheries industry, monitoring weather conditions, providing border patrols for national governments, and providing military surveillance before, during and/or after military operations.

Existing unmanned aircraft systems suffer from a variety of drawbacks. For example, existing unmanned aircraft systems (which can include the aircraft itself along with launch devices, recovery devices, and storage devices) typically require substantial space. Accordingly, these systems can be difficult to install and operate in cramped quarters, such as the deck of a small fishing boat, land vehicle, or other craft. Another drawback with some existing unmanned aircraft is that, due to small size and low weight, they can be subjected to higher acceleration and deceleration forces than larger, manned air vehicles and can accordingly be prone to damage, particularly when manually handled during recovery and launch operations in hostile environments, such as a heaving ship deck. Yet another drawback with some existing unmanned aircraft systems is that they may not be suitable for recovering aircraft in tight quarters, without causing damage to either the aircraft or the platform from which the aircraft is launched and/or recovered.

DETAILED DESCRIPTION

The present disclosure is directed generally to devices, systems, and techniques for capturing unmanned aerial vehicles (UAVs) without the need for a runway. Particular embodiments include a capture line that engages with the aircraft, and a carriage that moves along a carriage track as the UAV is captured, so as to suspend the UAV above the ground. For example, a representative system can include at least one support having an upright portion and at least one boom portion. A carriage track is carried by the boom portion, and a carriage is carried by and moveable along the carriage track. A capture line is carried by and extends downwardly from the boom portion, the carriage or both. In further embodiments, a releasable restraint device is coupled to the capture line and positioned to allow motion of the capture line in a first direction and prevent motion of the capture line in a second direction opposite the first direction, in addition to or in lieu of the carriage and carriage track. In still further embodiments, a landing device (e.g., a flexible, resilient landing device) cushions the aircraft as it comes to rest during a capture operation. In any of these arrangements, an aircraft can be captured (e.g. by engaging the capture line with engagement devices on the wingtips of the aircraft), while the system prevents the aircraft from colliding with the ground as the capture line pays out during a capture operation.

Other embodiments can include still further arrangements. For example, a system in accordance with another embodiment can include a support having an upright portion, a first boom portion extending from the upright portion in a first direction, and a second boom portion extending in a second direction different from the first direction. A carriage track is carried by, and positioned between, the first and second boom portions, and a carriage is carried by, and is moveable along, the carriage track. A capture line is carried by and extends downwardly from the carriage. In particular embodiments, the foregoing arrangement can have a generally triangular shape, and can be configured to collapse for ease of storage.

Figure 1:
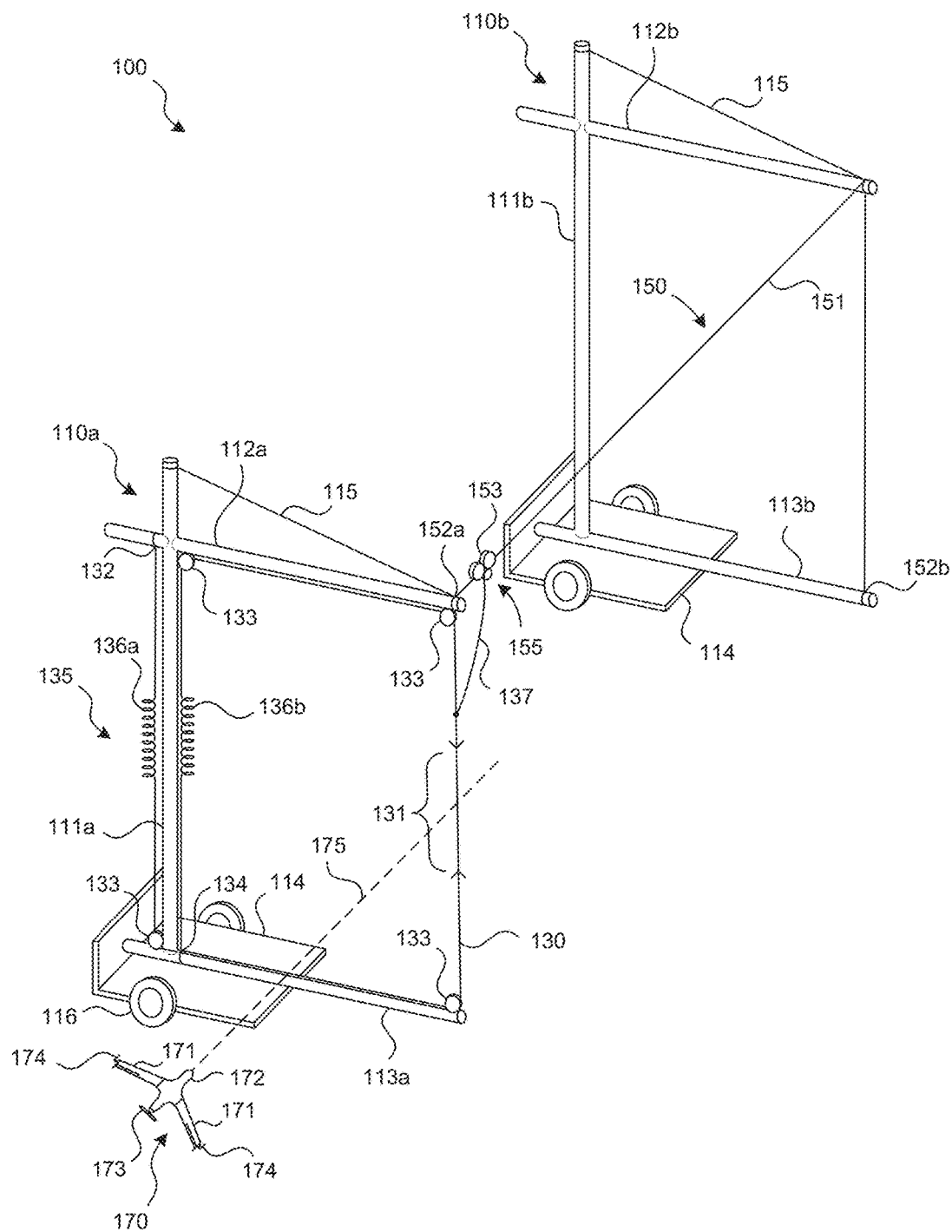
FIG. 1 is a partially schematic, isometric illustration of a system having a carriage track that includes a flexible line in accordance with an embodiment of the present technology.

FIG. 1 illustrates a representative system 100 configured to capture an aircraft, e.g., an unmanned aerial vehicle (UAV) 170 in accordance with a particular embodiment of the present technology. The aircraft 170 can include a fuselage 172, wings 171 and a propulsion system 173 (e.g., an engine-driven propeller). The aircraft 170 can also include one or more capture or engagement devices 174 suitable for arresting or capturing the aircraft 170. In one embodiment, the engagement devices 174 can include wing-mounted clips or cleats, and in other embodiments, the engagement devices 174 can include other suitable structures.

The system 100 is configured to capture the aircraft 170 by releasably engaging with one or more of the engagement devices 174. The system 100 can include two supports 110, illustrated as a first support 110a and a second support 110b, spaced apart from the first support 110a. Each support 110a, 110b can include a corresponding upright portion 111 (illustrated as a first upright portion 111a and a second upright portion 111b) and one or more boom portions 112. For example, the arrangement shown in FIG. 1 can include an upper boom portion 112a and a lower boom portion 113a carried by the first support 110a, and an upper boom portion 112b and lower boom portion 113b carried by the second support 110b. Boom guy lines 115 steady the upper boom portions 112a, 112b relative to the respective supports 110a, 110b.

The first and second supports 110a, 110b are configured to carry or support a carriage track 150 above the ground, ship deck or other surface. The carriage track 150 in turn supports a carriage 153. The carriage 153 can slide or roll along the carriage track 150 along a generally linear path. One or more of the supports 110a, 110b (e.g., the first support 110a) is operatively coupled to a flexible capture line 130 which is used to capture the aircraft 170. In one aspect of an embodiment shown in FIG. 1, the capture line 130 includes a rope, cable, or other thin, elongated flexible structure having an engagement region 131, which the aircraft 170 strikes and to which the aircraft 170 releasably attaches during a capture operation. The capture line 130 can be connected at one end to the first support 110a (e.g., at a first attachment point 132), then passes around a series of pulleys 133, and attaches to a base 114 of the first support 110a at its other end (e.g., at a second attachment point 134). The system 100 can include an energy absorber or energy sink 135 that is operatively coupled to the capture line 130 to absorb energy directed into the system 100 by the aircraft 170 as it is captured. For example, the energy absorber 135 can include one or more elastic members 136 (shown as a first elastic member 136a and a second elastic member 136b), such as a bungee, spring, or other flexible, stretchable element that connects axially with (and can form portions of) the capture line 130, thus allowing the capture line 130 to stretch or pay out as the aircraft 170 strikes it.

If the capture line 130 were allowed to stretch and retract in an unrestrained manner, the capture line 130 would first stretch or extend as the aircraft 170 strikes it and then recoil or contract as the elastic members 136a, 136b contract. To prevent this outcome, the system 100 can include features that limit the motion of the carriage 153 and the capture line 130. For example, a restraint device 155 can include a restraint line 137 (e.g. a cable, rope, or other suitable element) connected transversely to the capture line 130 and extending between the capture line 130 and the carriage 153. As the capture line 130 extends or stretches in a first direction under the force imparted by the incoming aircraft 170, the restraint line 137 drags the carriage 153 along the carriage track 150, e.g., from a first position to a second position. At the end of the carriage's travel along the carriage track 150, a ratchet or locking mechanism (not visible in FIG. 1) in the carriage 153 and/or the carriage track 150 prevents the carriage 153 from traveling backward along the carriage track 150, and also prevents the capture line 130 from moving in a second (opposite) direction. Accordingly, the restraint device 155 can include the restraint line 137 and the locking or ratchet mechanism, which is operatively coupled to the restraint line 137. The restraint device 155 is sized and configured to prevent the stretched or paid-out capture line 130 from allowing the now-captured aircraft 170 to strike the surface on which the system 100 is placed. For example, when the restraint device 155 includes a flexible restraint line 137 (as shown in FIG. 1), the length of the restraint line 137 can be sized so that when the aircraft 170 is captured at any position along the engagement region 131, the lowest portion of the aircraft 170 remains high enough to avoid striking the ground. Typically, the lowest portion is the tip of the wing opposite the wing that is engaged with the capture line 130, but in other embodiments, the lowest portion can be different. The restraint line 137 can be connected to the capture line 130 above the engagement region 131 (as shown in FIG. 1) to reduce or eliminate interference with the aircraft 170 and/or the capture line 130 during capture.

In a particular aspect of the embodiment shown in FIG. 1, the carriage track 150 has the form of a flexible line 151, which is attached to the first support 110a at a first attachment point 152a, and is attached to the second support 110b at a second attachment point 152b. The first and second supports 110a, 110b are then securely (and typically releasably) connected to or weighted down on the surface on which they rest, so as to reduce the slack in the line 151 forming the carriage track 150. The bases 114 of the supports 110a, 110b can include wheels 116 or other elements that facilitate changing the position of the system 100.

In operation, the aircraft 170 approaches the system 100 along a flight path 175. In an embodiment shown in FIG. 1, the engagement devices 174 are mounted near the tips of the wings 171 so that when the aircraft 170 flies into the capture line 130, at least one of the engagement devices 174 securely but releasably fastens the aircraft 170 to the capture line 130.

At impact, the momentum of the aircraft 170 begins to transfer to the system 100 and the capture line 130 begins to extend, stretch, or pay out. As the capture line 130 extends, the restraint line 137 pulls the carriage 153 along the carriage track 150. When the aircraft 170 stops its forward motion (e.g. due to a sufficient loss of momentum or due to other factors that may include reaching the end of the carriage track 150), the restraint device 155 (e.g., a ratchet or locking mechanism in the carriage 153 and/or carriage track 150) prevents the carriage 153 and therefore the restraint line 137 and the capture line 130 from retracting. To release the aircraft 170, the operator disengages the engagement device 174 from the capture line 130. The energy absorber 135 can be reset (e.g., by gradually releasing the ratchet device 155 and allowing the elastic members 136a, 136b to contract), and the carriage 153 and capture line 130 are repositioned for another capture operation.

As described above, one feature of the system 100 is that the carriage track 150 can include a flexible line 151. One advantage of this feature is that the system 100 can be lightweight and easily stowed. A potential drawback with this system is that the carriage track 150 can sag under the weight of the captured aircraft 170. Embodiments described below with reference to FIGS. 2A-10B can address this attribute by providing rigid carriage tracks and/or compression members that prevent the carriage track from sagging.

Figure 2A:
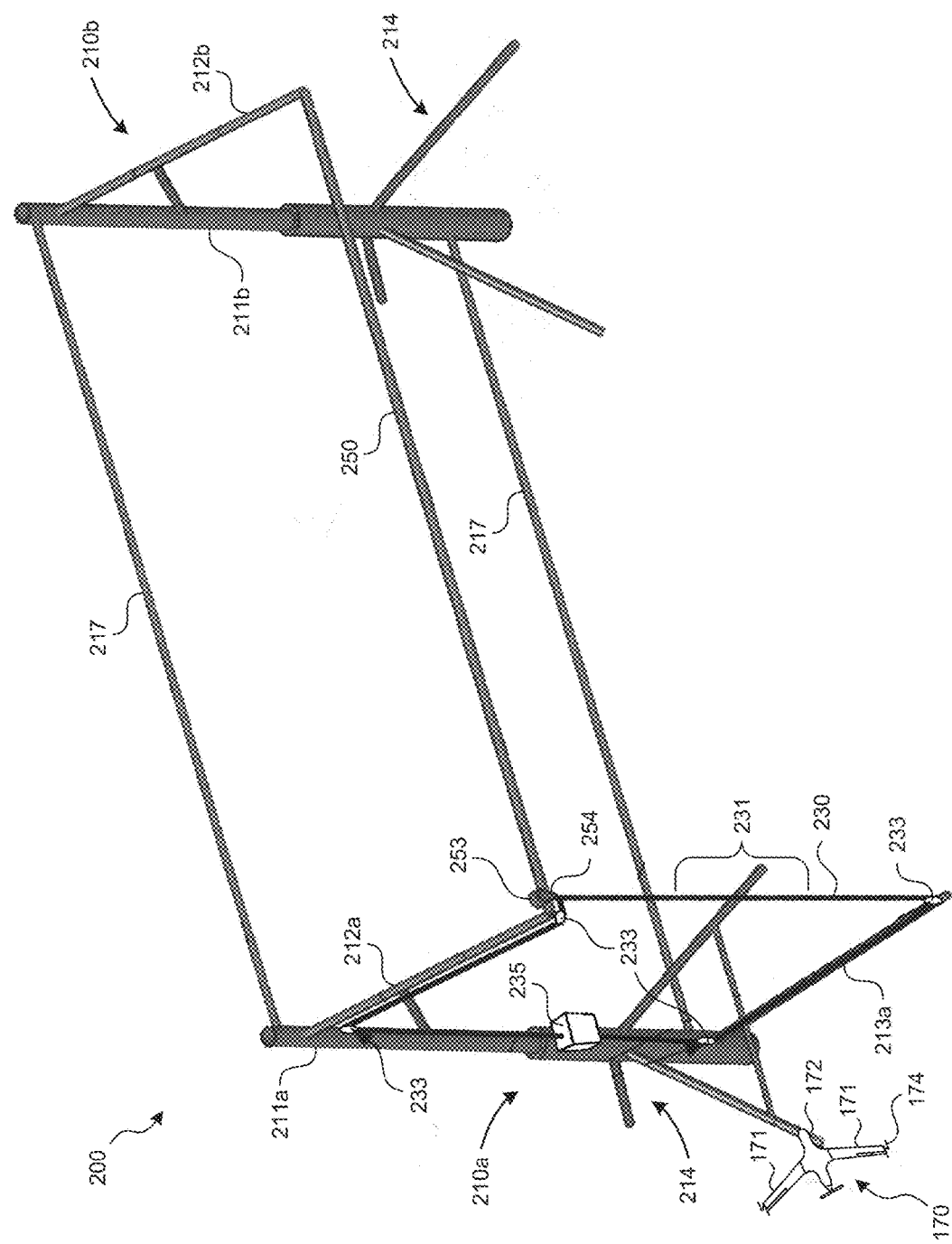
FIG. 2A illustrates a system that includes a rigid carriage track in accordance with another embodiment of the present technology.

FIG. 2A is a partially schematic, isometric illustration of a system 200 configured in accordance with another embodiment of the present technology. The system 200 can include first and second supports 210a, 210b, each having a corresponding upright portion 211a, 211b, a corresponding upper boom portion 212a, 212b, and a corresponding base 214. The first support 210a can also include a lower boom portion 213a. A carriage track 250 is positioned between the upper boom portions 212a, 212b and can include a generally rigid conduit, pipe or other rigid member. The system 200 can further include one or more compression members 217 that are also connected between the first and second supports 210a, 210b. The compression members 217 can prevent the weight of the captured aircraft 170 from (a) causing the carriage track 250 to sag, and/or (b) drawing the first and second supports 210a, 210b toward each other.

The system 200 can further include a carriage 253. The carriage 253 can include a carriage roller 254 that allows the carriage 253 to roll along the carriage track 250. The carriage 253 can also engage with a capture line 230 for capturing the aircraft 170. The capture line 230 can include an engagement region 231 positioned to make contact with the aircraft 170. In a particular embodiment, the capture line 230 can be slideably engaged with the carriage 253. For example, the carriage 253 can include a ring through which the capture line 230 passes. In other embodiments, the carriage 253 can include a roller or pulley around which the capture line 230 passes. In still further embodiments, the carriage 253 is fixedly attached to the capture line 230. The capture line 230 can pass around a plurality of capture line pulleys 233 carried by the first support 210a, so as to be connected to an energy absorber 235. The energy absorber 235 can allow the capture line 230 (e.g. a stored portion of the capture line) to pay out under the force applied to the capture line 230 by the aircraft 170. The energy absorber 235 can include a spring, bungee, or other stretchable or extendable element that resists paying out the capture line 230. In a particular embodiment, the energy absorber 235 can include a spring-loaded reel, or a reel outfitted with a break to apply force to the capture line 230. In a particular embodiment, the force applied by the energy absorber 235 can vary, for example, as described in further detail later with reference to FIG. 12G.

Figure 2B:
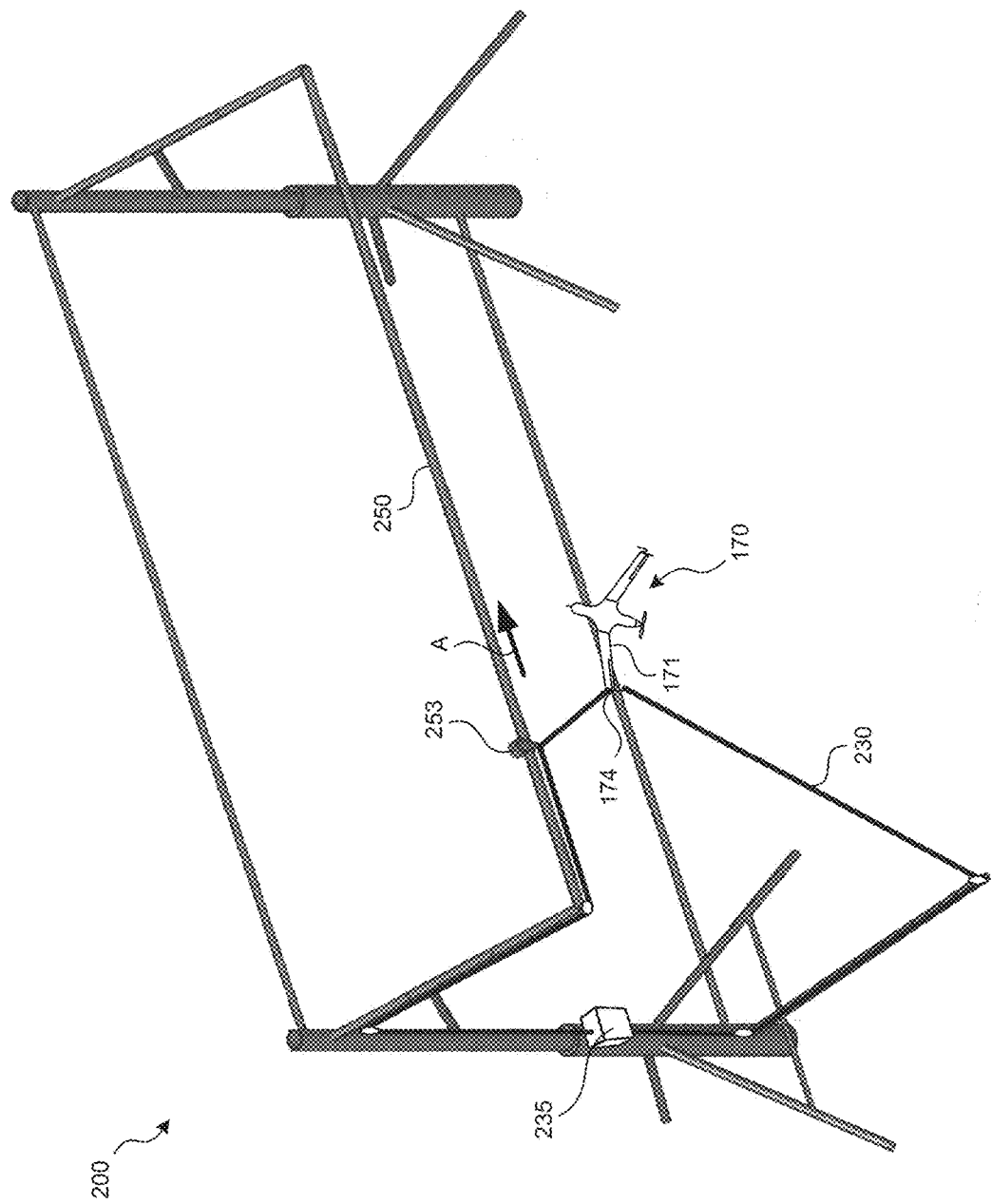
FIGS. 2B-2C illustrate the system of FIG. 2A during a capture operation in accordance with an embodiment of the present technology.

FIG. 2B illustrates the system 200 after the aircraft 170 has engaged with the capture line 230. The force of the impact between the aircraft 170 and the capture line 230 causes the energy absorber 235 to extend or pay out the capture line 230, and causes the carriage 253 to move along the carriage track 250, as indicated by arrow A.

Figure 2C:
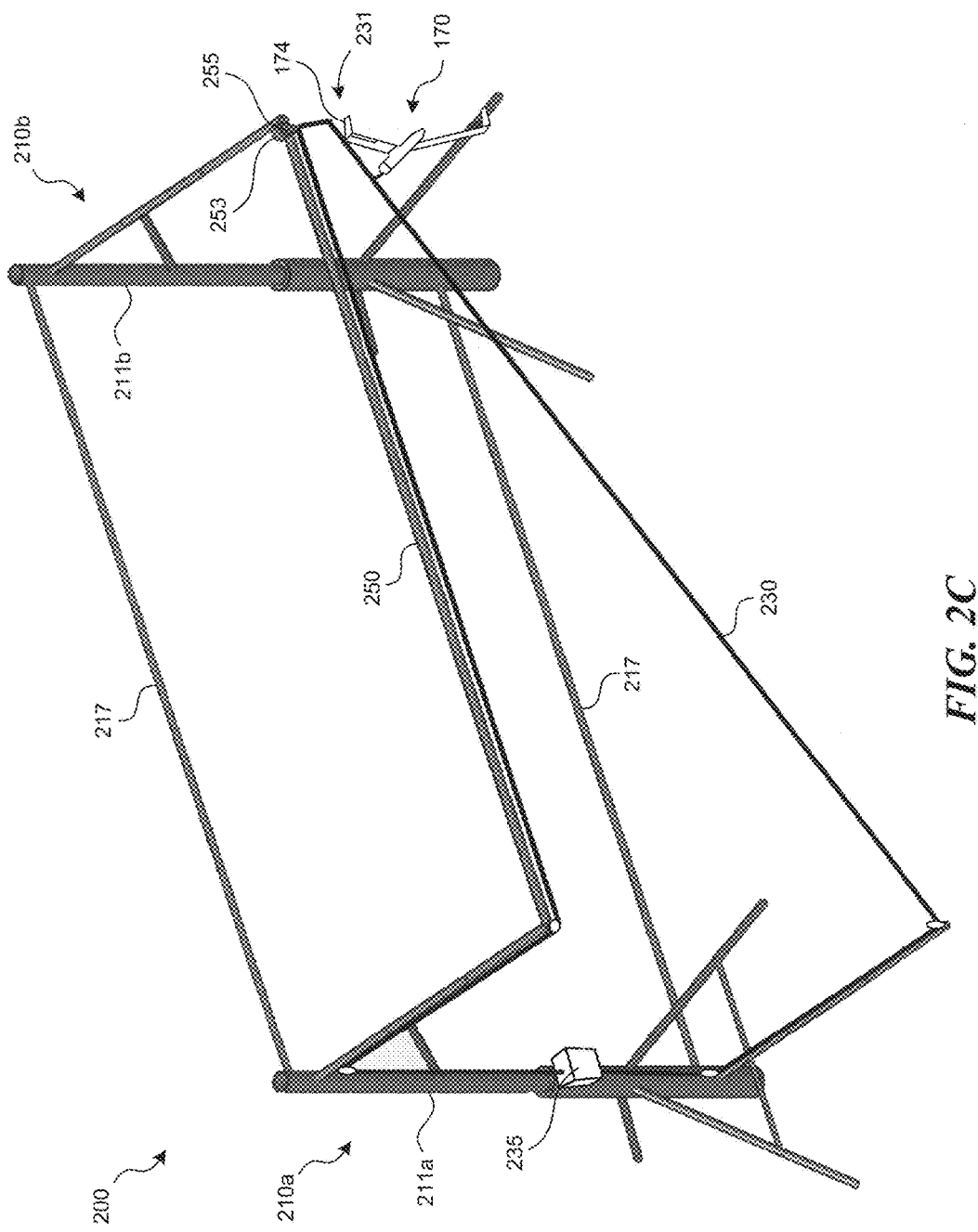

FIG. 2C illustrates the system 200 after the carriage 253 has reached the end of the carriage track 250. A restraint device 255 (e.g., a ratchet) in the carriage 253 prevents the carriage 253 from being pulled back under the return force that may be applied to the capture line 230 by the energy absorber 235. The compression members 217 (and the ability of the carriage track 250 to withstand compression forces), prevent or significantly restrict the tendency for the carriage track 250 to sag, and/or the tendency for the supports 210a, 210b to lean or collapse toward each other. The upright portions 211a, 211b of the supports 210a, 210b are high enough so that when the aircraft 170 strikes the capture line 230 at the engagement region 231, and hangs from the capture line 230 as shown in FIG. 2C, the aircraft 170 does not touch the ground. Once the aircraft 170 reaches the position shown in FIG. 2C, it can be gently lowered and released. In a particular embodiment, the capture line 230 can be released from the carriage 253 to allow the aircraft 170 to be gently lowered.

Figure 2D:
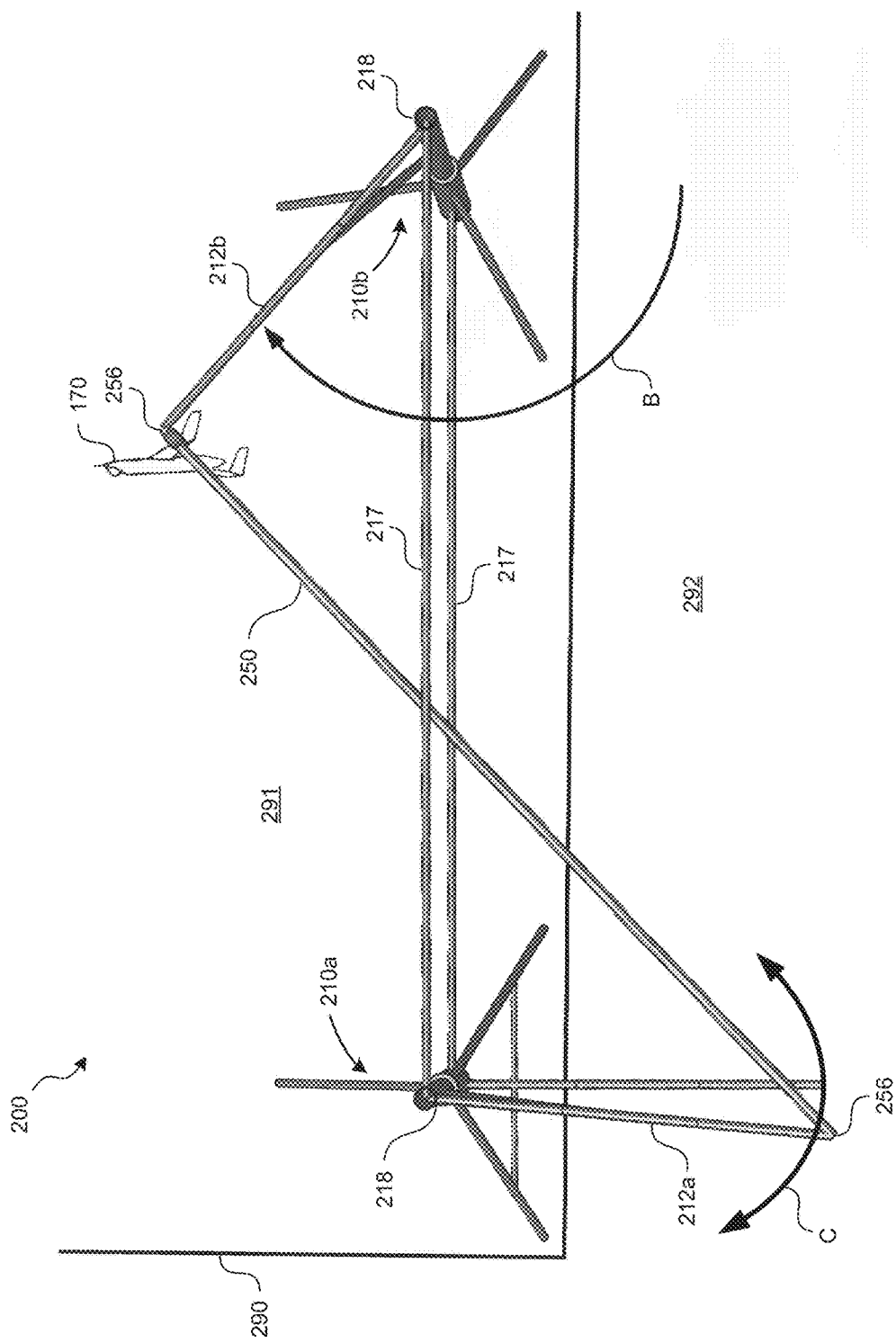
FIG. 2D illustrates an embodiment of a system in which the carriage track is articulatable, in accordance with another embodiment of the present technology.

FIG. 2D is a downward-looking view of a particular embodiment in which the system 200 is carried by a ship 290 having a deck 291 positioned over the water 292. In a particular aspect of this embodiment, the carriage track 250 can be configured to allow the captured aircraft 170 to be moved over the deck 291 for release, rather than being left dangling over the water 292. Accordingly, each support 210a, 210b can include a boom pivot joint 218 that allows the corresponding upper boom portions 212a, 212b to rotate. In addition, the carriage track 253 can be connected to the booms at carriage track pivot joints 256 that allow the carriage track 253 to pivot relative to the upper boom portions 212a, 212b. As the second upper boom portion 212b is swung inwardly over the ship's deck 291 (as indicated by arrow B), the first upper boom portion 212a moves first clockwise and then counterclockwise, as indicated by arrow C, in an articulated manner to facilitate the motion of the second upper boom portion 212b. An advantage of this arrangement is that it allows the aircraft capture operation to occur over the water 292 and away from the ship's superstructure, while also allowing the aircraft 170 to be readily moved over the deck 291 for release.

Figure 3:
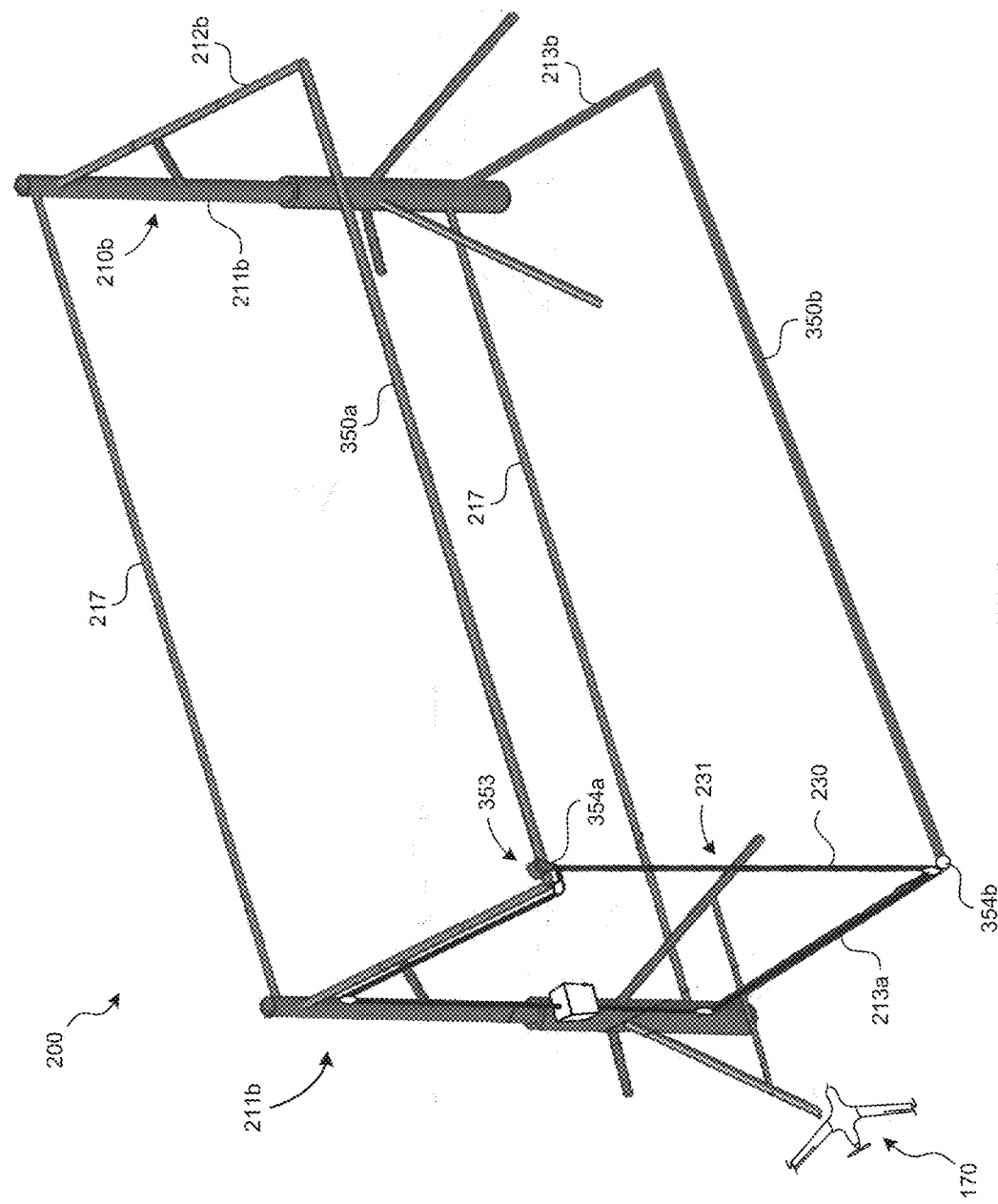
FIG. 3 is a partially schematic, isometric illustration of a system that includes upper and lower carriage tracks in accordance with another embodiment of the present technology.

FIG. 3 is a partially schematic illustration of another embodiment of the system 200, which further includes a lower boom portion 213b carried by the second support 210b, and a carriage track arrangement that includes an upper carriage track 350a and a lower carriage track 350b. A corresponding carriage 353 can include an upper portion 354a (e.g., a first roller or wheel) and a lower portion 354b (e.g., a second roller or wheel), each of which rolls along the corresponding carriage track 350a, 350b. The lower portion 354b engages with the capture line 230 in a manner generally similar to any of those described above with reference to FIG. 2A. As the aircraft 170 engages with the capture line 230, the portion of the capture line between the upper carriage track 350a and the lower carriage track 350b remains in a more upright orientation than the capture line 230 shown in FIG. 2C, as a result of the lower carriage portion 354b traveling along the lower carriage track 350b. One aspect of this arrangement is that it can reduce the likelihood for the aircraft 170 to strike the capture line 230 in any manner other than the intended manner. Put another way, this arrangement can keep parts of the capture line 230 (other than the engagement portion 231) out of the way of the aircraft 170. In addition, the lower carriage track 350b and the second lower boom portion 213b can increase the stiffness of the overall system 200.

One characteristic of the embodiments described above is that they have a generally rectangular or box-like shape. In other embodiments, described further below with reference to FIGS. 4-10B, the capture systems can have a generally triangular shape, and can be configured to collapse into a compact arrangement for transportation.

Figure 4:
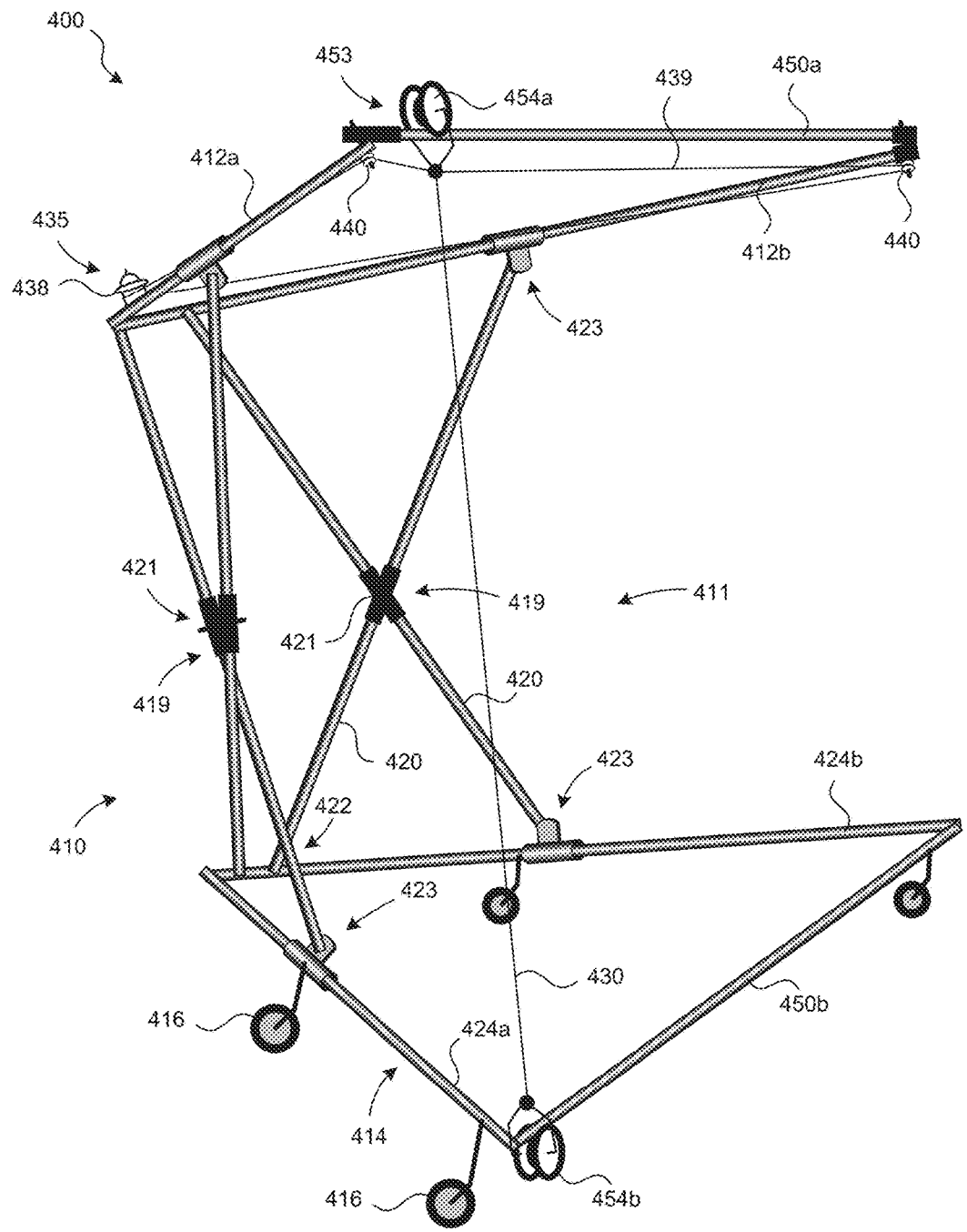
FIG. 4 is a partially schematic, isometric illustration of a system that includes a generally triangular arrangement of booms and a carriage track, in accordance with another embodiment of the present technology.

Beginning with FIG. 4, a system 400 configured in accordance with a particular embodiment can include a support 410 having an upright portion 411 that carries a first boom portion 412a extending in a first direction, and a second boom portion 412b extending in a second direction different than the first. The system 400 can also include a base 414 that in turn includes a first base portion 424a and a second base portion 424b. The base portions 424a, 424b can be located below the corresponding boom portions 412a, 412b. An upper carriage track 450a extends between the ends of the first and second boom portions 412a, 412b, and a lower carriage track 450b extends between the ends of the first and second base portions 424a, 424b. A carriage 453, which can include an upper portion 454a (e.g., an upper roller) and a lower portion 454b (e.g., a lower roller), carries a capture line 430 in a generally vertical orientation suitable for capturing the aircraft 170 described above with reference to FIGS. 1-3.

The upright portion 411 of the system 400 can include a pair of scissor jacks or links 419, each of which includes a pair of scissor members 420 pivotally connected to each other at corresponding scissor pivots 421. Each scissor member 420 can be connected to the system 400 at one end via a pivot joint 422, and at the other end via a slide joint 423. This arrangement can allow the upper boom portions 412a, 412b to be easily moved up and down relative to the base 414.

In another aspect of an embodiment shown in FIG. 4, the capture line 430 is not necessarily configured to stretch or to be paid out. Instead, the capture line 430 can have a fixed length between the upper carriage portion 454a and the lower carriage portion 454b. The energy imparted to the system by the aircraft 170 (FIG. 3) can be absorbed by an energy absorber 435 that is coupled to the carriage 453 via an absorber line 439. In a particular embodiment, the energy absorber 435 can include a capstan 438. The absorber line 439 can be fixedly connected to the carriage 453 (e.g. proximate to the upper carriage portion 454a) and can have the form of a continuous loop that passes around two absorber line pulleys 440, and around the capstan 438 of the energy absorber 435. The capstan 438 in turn can be coupled to a resistance or brake device, for example, a magnetic eddy brake or other device that dissipates the energy transmitted by the aircraft 170 to the capture line 430. In operation, as the aircraft 170 engages with the capture line 430, it pulls the upper and lower carriage portions 454a, 454b along the corresponding upper and lower carriage tracks 450a, 450b while the upper carriage portion 454a pulls the absorber line 439 around the energy absorbing capstan 438. Further details of this operation are described below with reference to FIGS. 8A-8C. Other lines, e.g., used to erect and collapse the system 400, are not shown in FIG. 4 for purposes of illustration, and are described further below with reference to FIG. 5.

The system 400 can also include one or more position rollers, wheels, or other transport features 416 coupled to the base 414 or another suitable portion of the structure. The transport features 416 can allow the system 400 to be easily reoriented, for example, if the wind shifts direction. Once the system 400 is in a suitable position, it can be staked down or tied down to prevent it from moving under the impact force of the aircraft 170. The triangular shape of the base 414 can provide a stable platform that withstands the impact forces of the aircraft 170.

Figure 5:
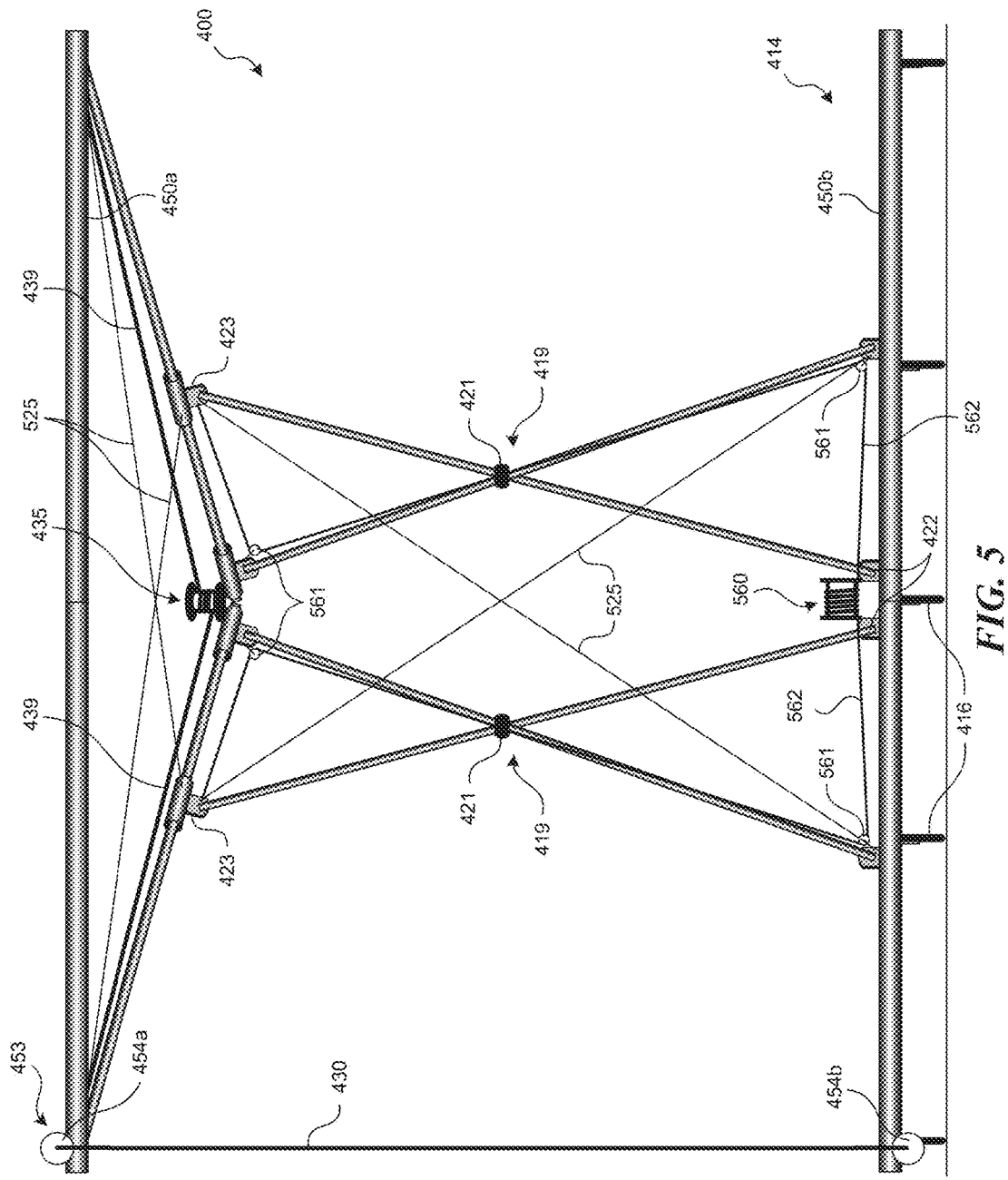
FIG. 5 is a partially schematic, front view illustration of an embodiment of the system shown in FIG. 4.

FIG. 5 is a front view of the system 400 shown in FIG. 4, illustrating several additional features. For example, FIG. 5 illustrates multiple support lines 525 that add rigidity to the system 400 when it is in the operational configuration. The system 400 can alternate between the operational configuration shown in FIG. 5 and a collapsed configuration under the power of a deployment winch 560 or another suitable deployment actuator. The deployment winch 560 can be coupled to one or more deployment lines 562 that pass around a series of deployment pulleys 561. When released, the deployment lines 562 allow the scissor jacks 419 to collapse. When wound up on the deployment winch 560, the deployment lines 562 pull the scissor jacks 419 to the upright position shown in FIG. 5.

Figure 6:
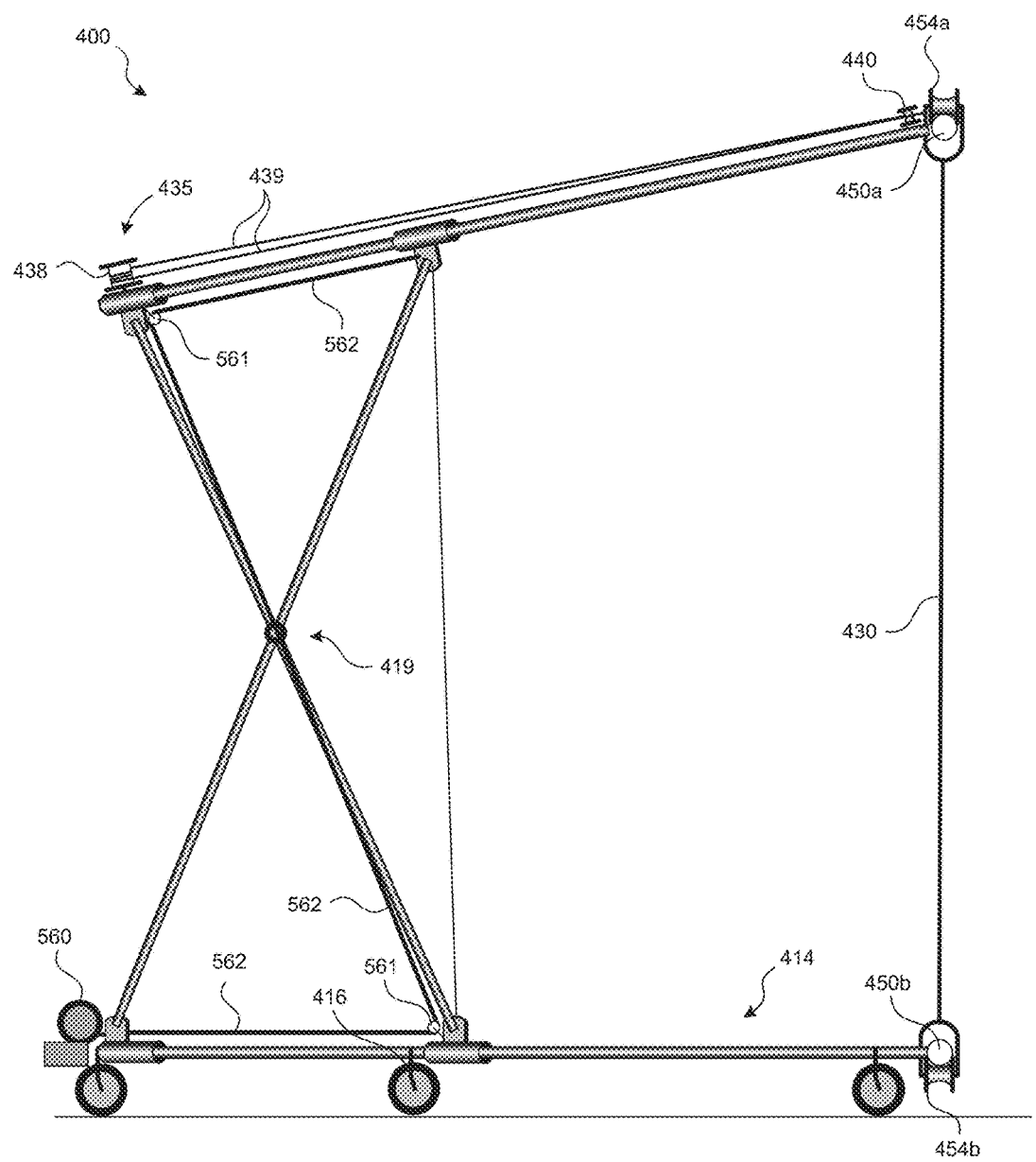
FIG. 6 is a partially schematic, side view illustration of an embodiment of the system shown in FIG. 4.

FIG. 6 is a side view of an embodiment of the system 400 described above with reference to FIGS. 4 and 5. FIG. 6 further illustrates the deployment winch 560, the deployment lines 562 and the deployment pulleys 561 used to raise and lower the scissor jack 419. FIG. 6 also illustrates the energy absorber 435 and energy absorber line 439 as it passes around the capstan 438 and the absorber line pulleys 440 (one of which is visible in FIG. 6) in a continuous loop. This arrangement is described in further detail below with reference to FIG. 7.

Figure 7:
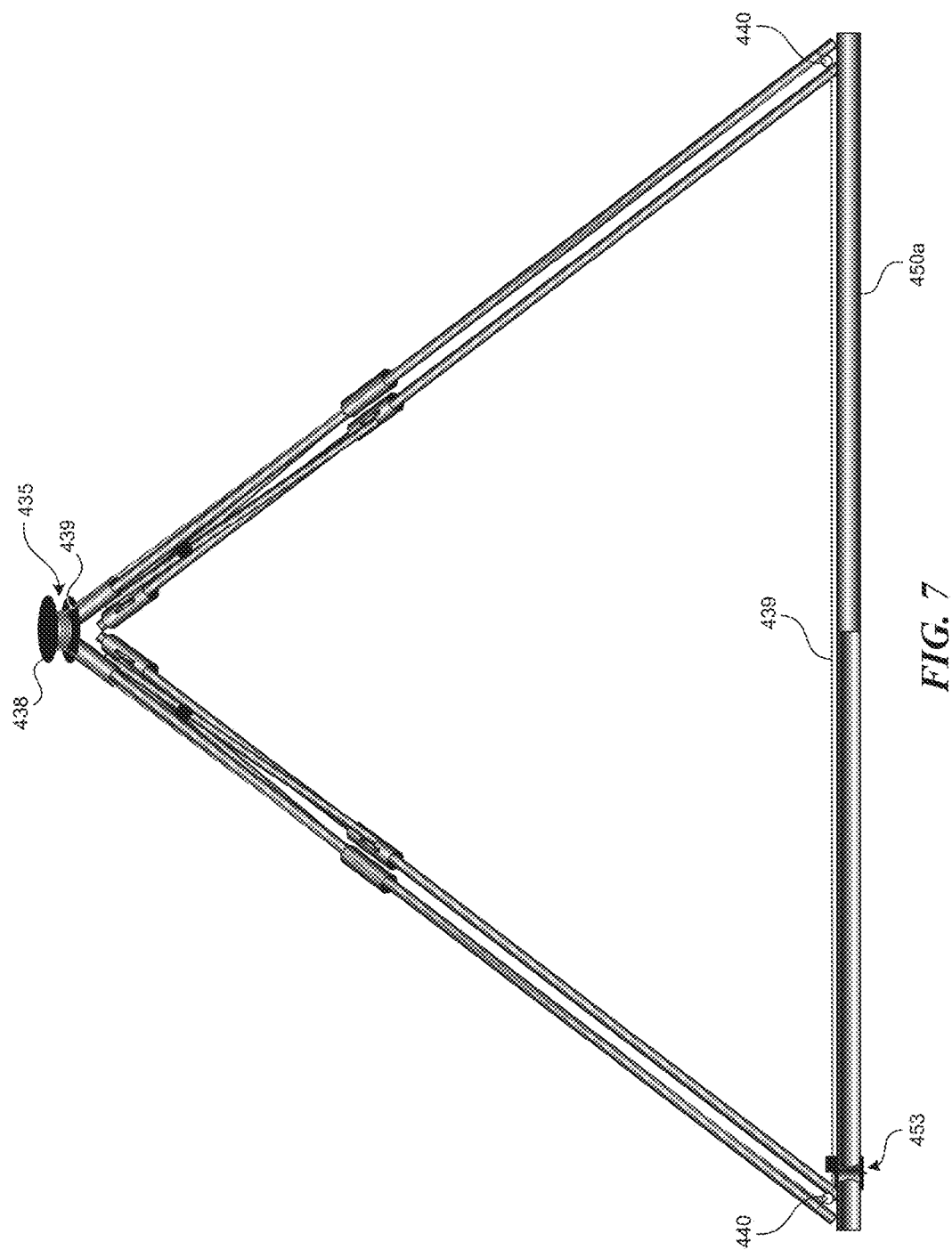
FIG. 7 is a partially schematic, top view illustration of an embodiment of the system shown in FIG. 4.

Referring now to FIG. 7, the continuous absorber line 439 passes around the two absorber line pulleys 440 for guidance, and is then wrapped (e.g., multiple times) around the capstan 438. As the carriage 453 moves along the upper carriage 450a, it pulls the absorber line 439 around the capstan 438 to dissipate the impact energy imparted to the system 400 by the captured aircraft. A corresponding sequence illustrating this arrangement is described below with reference to FIGS. 8A-8C.

Figure 8A:
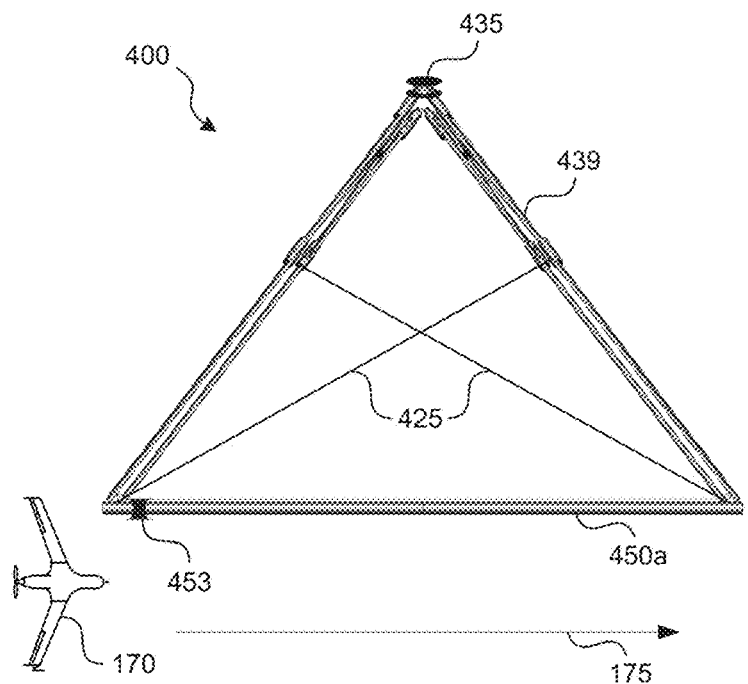
FIGS. 8A-8C illustrate two top views and a front view, respectively, of embodiments of the system shown in FIG. 4 during several phases of an aircraft capture operation, in accordance with embodiments of the present technology.
Figure 8B:
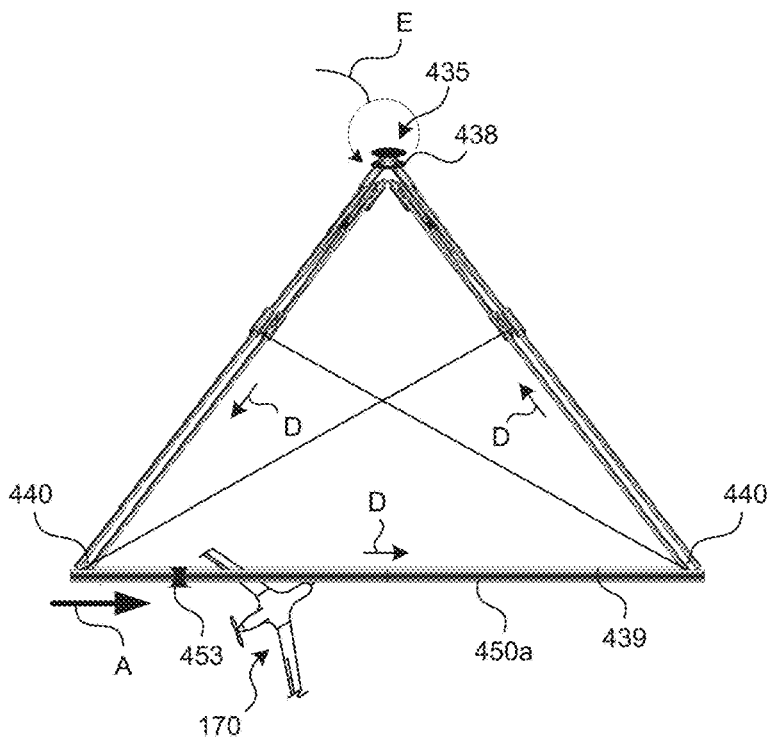

As shown in FIG. 8A, the aircraft 170 approaches the system 400 along a flight path 175. In FIG. 8B, the aircraft 170 has engaged with the capture line (not visible in FIG. 8B), with the force of the impact drawing the carriage 453 along the upper carriage track 450a as indicated by arrow A. As the carriage 453 moves along the upper carriage track 450a, it drags the absorber line 439 around the circuit formed by the absorber line pulleys 440 and the capstan 438, is indicated by arrows D. The capstan 438 rotates as indicated by arrow E and absorbs energy. The carriage 453 stops when the aircraft 170 has lost its forward momentum and/or when carriage 453 reaches the end of the upper carriage track 450a. A restraint device (e.g., a ratchet or any other suitable device carried by carriage 453 and/or the upper carriage track 450a) prevents the carriage 453 from recoiling. Alternately, the friction of the capstan 438 or a ratchet mechanism at the energy absorber 435 can prevent such a recoil motion, and can therefore operate as a restraint device.

Figure 8C:
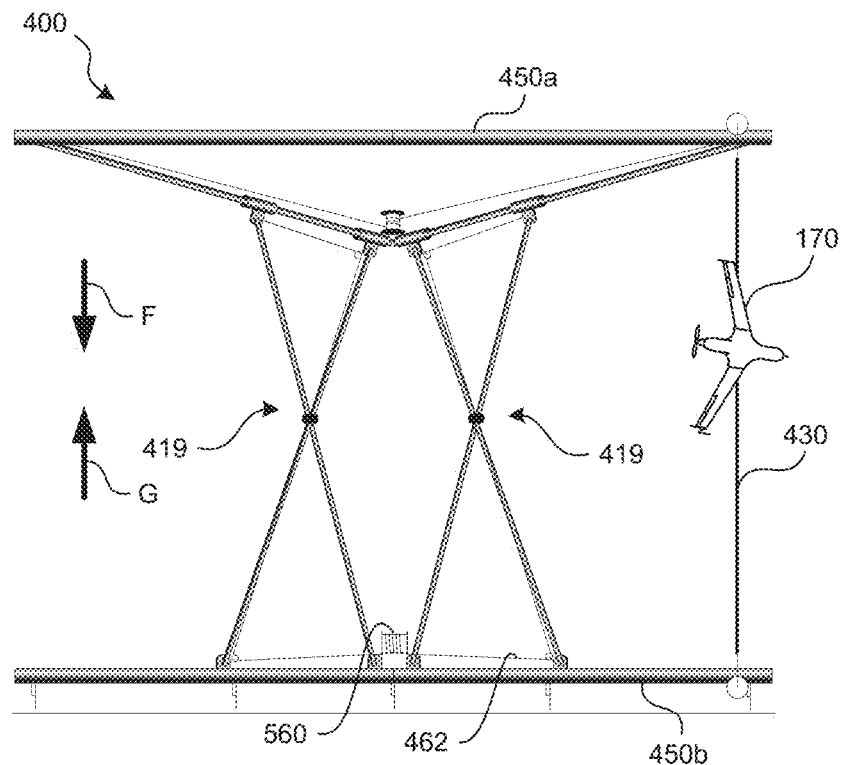

FIG. 8C illustrates the system 400 after the aircraft 170 has been successfully captured. With the aircraft 170 in this position, the deployment winch 560 can be released or deactivated, allowing the scissor jacks 419 to at least partially collapse and lower the aircraft 170, as indicated by arrow F. An operator and then releases the aircraft 170 from the system 400. The deployment winch 560 can then be reactivated to raise the upper carriage track 450a to an operational position, as indicated by arrow G.

Figure 9A:
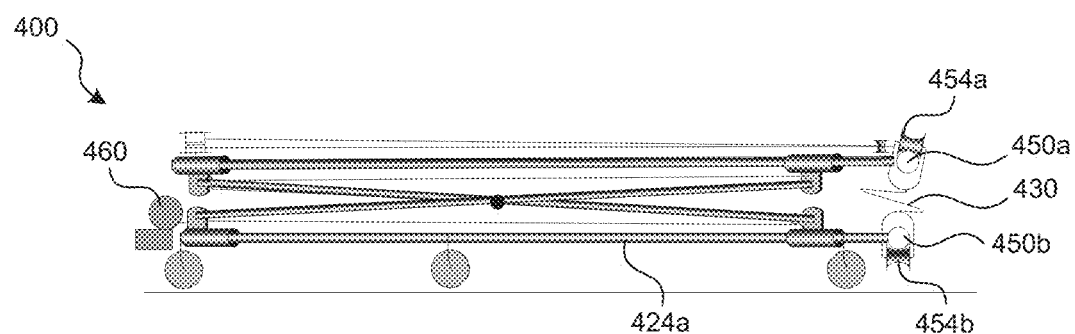
FIGS. 9A-9C are partially schematic, side view illustrations of an embodiment of the system shown in FIG. 4 during a deployment operation, in accordance with an embodiment of the present technology.
Figure 9B:
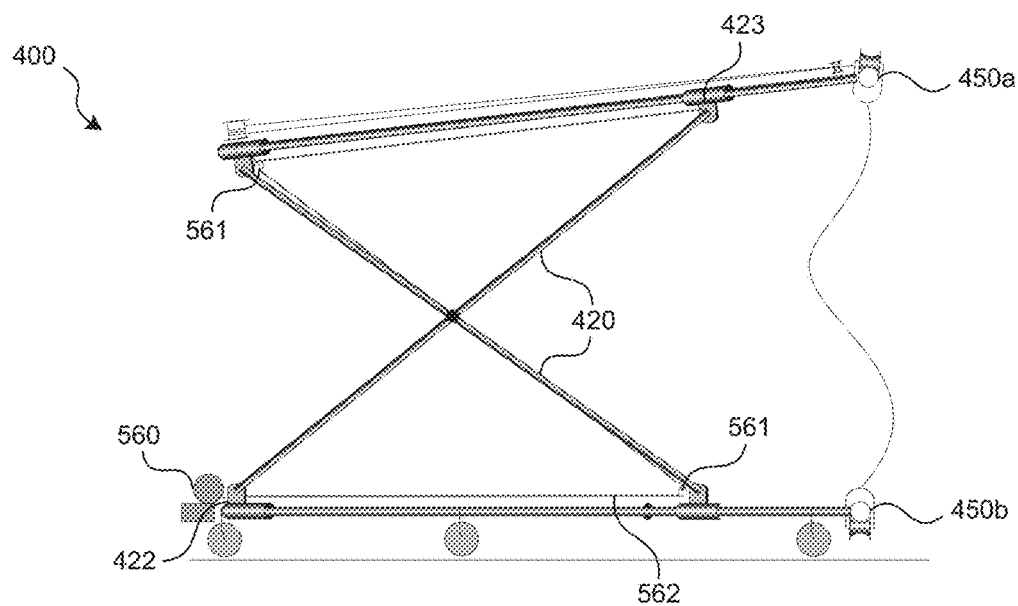
Figure 9C:
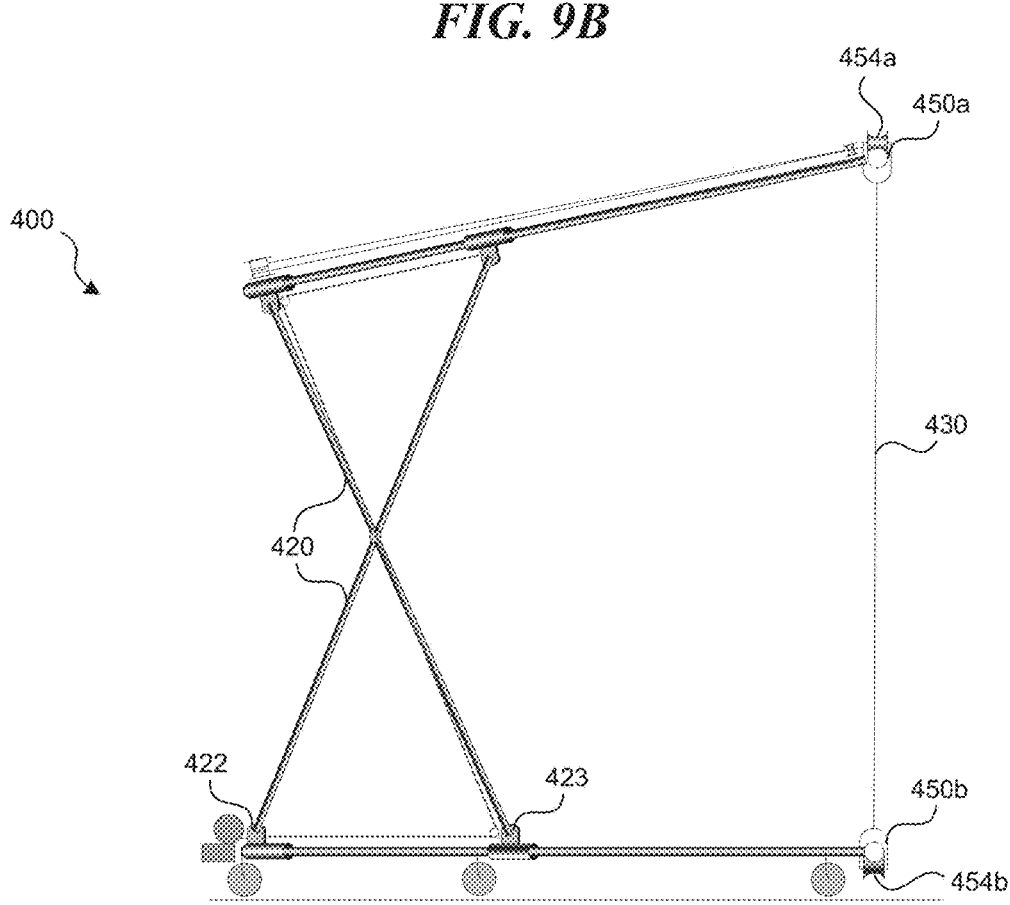

In addition to moving the upper carriage track 450a relative to the lower carriage track 450b to release a captured aircraft 170, the deployment winch 560 can be used to collapse and erect the system 400. For example, as shown in side view in FIG. 9A, the system 400 can initially be placed in a collapsed position with the upper carriage track 450a positioned close to the lower carriage track 450b, and the capture line 430 slack. In FIG. 9B, the deployment winch 560 has been activated to wind up the deployment line 562, thereby erecting the scissor members 420 and raising the upper carriage track 450a. In FIG. 9C, the system 400 has been fully erected, with the capture line 430 now tensioned (or partially tensioned) between the upper carriage portion 454a and the lower carriage portion 454b. The foregoing sequence can be reversed to return the system 400 to the collapsed configuration shown in FIG. 9A.

Figure 10A:
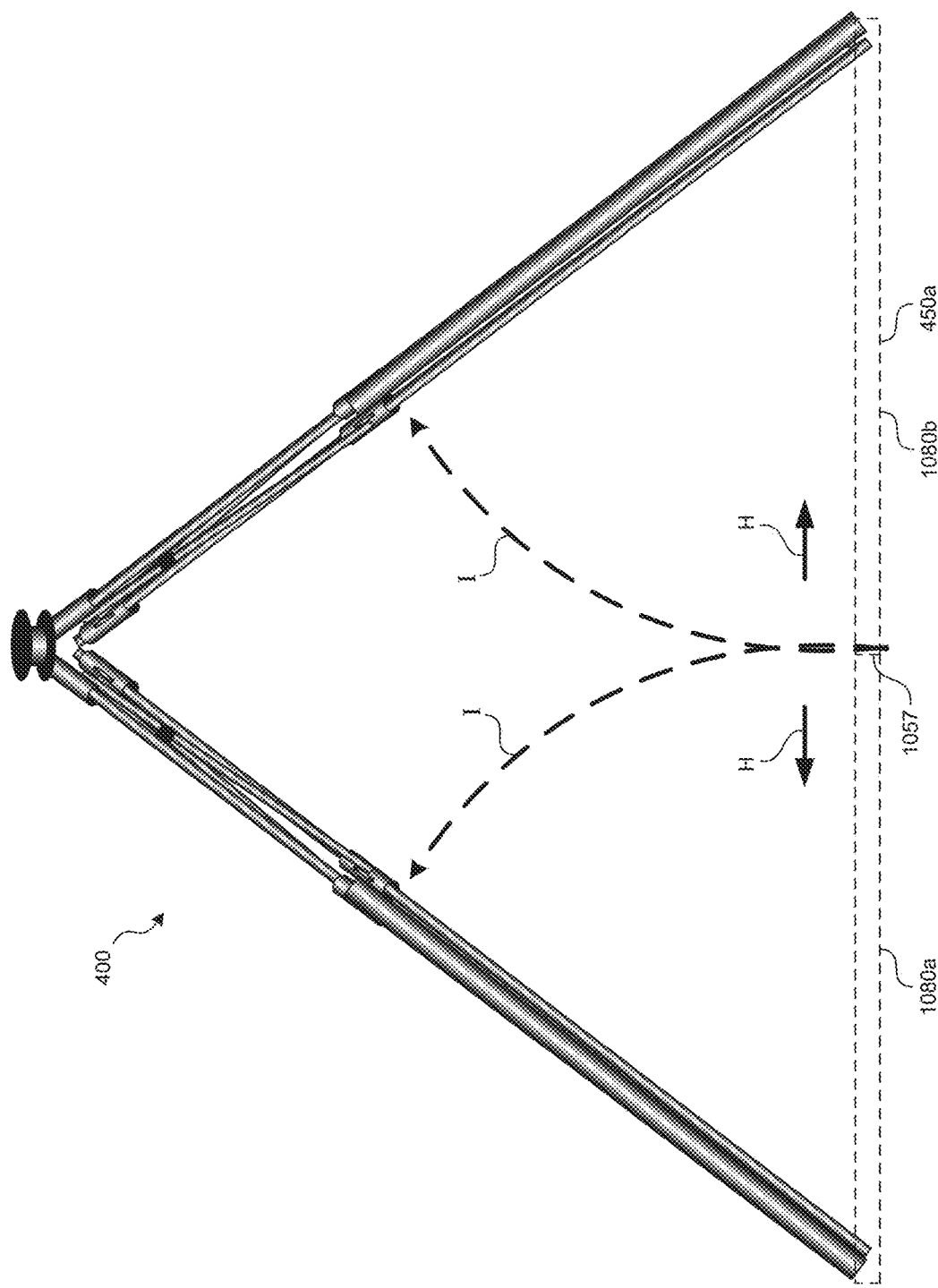
FIGS. 10A-10B illustrate a process for collapsing an embodiment of the system described above with reference to FIG. 4, in accordance with another embodiment of the present technology.

Referring now to FIG. 10A, the system 400 can be further collapsed for storage and/or transport. In particular, the upper carriage track 450a can include a separable joint 1057 that allows the upper carriage track 450a to be separated into two segments 1080a, 1080b which are then moved apart and away from each other (as indicated by arrows H) and then rotated to align with the corresponding boom portions (as indicated by arrows I). The lower carriage track 450b, which is not visible in the top view of FIG. 10A, can be stowed in a similar matter.

Figure 10B:
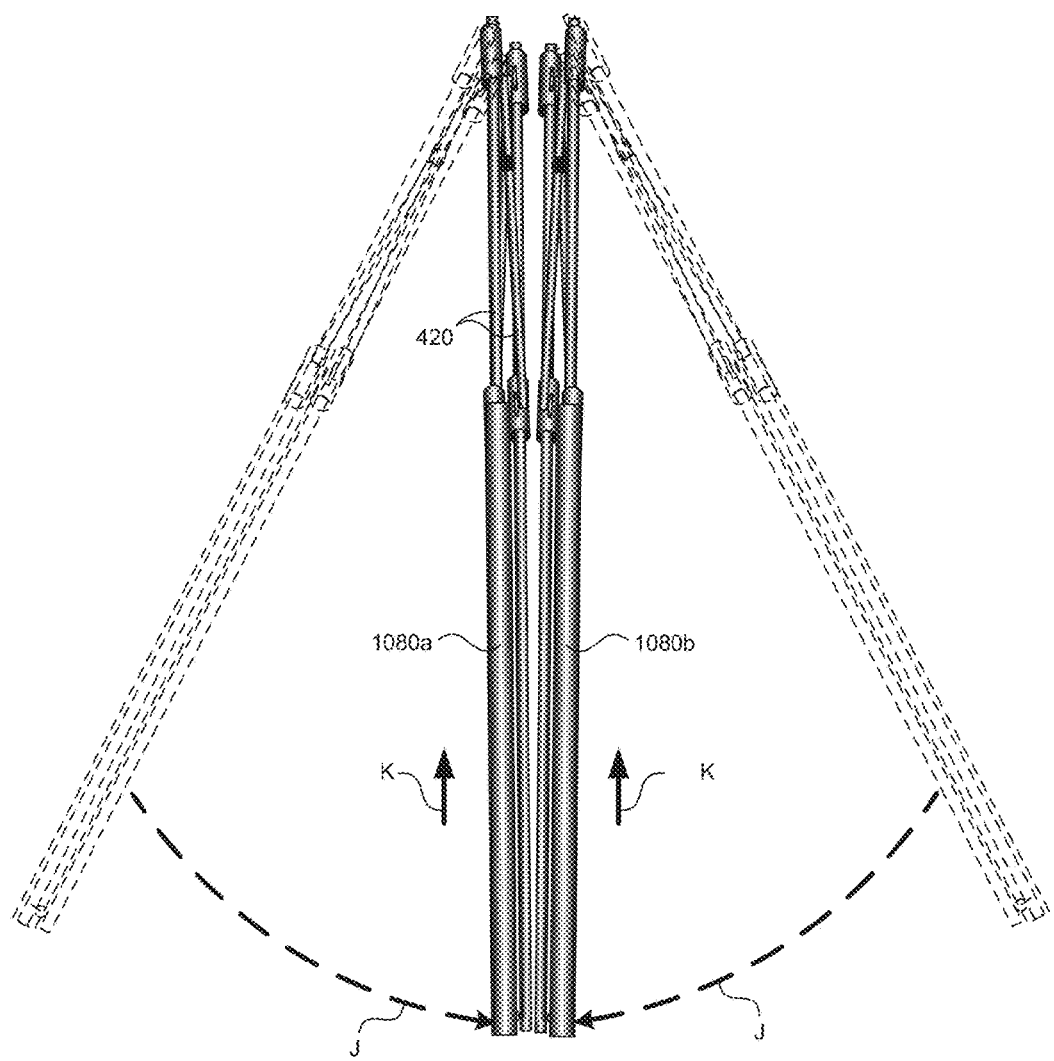

In FIG. 10B, the carriage tracks, boom portions and scissor members 420 can be collapsed toward each other as indicated by arrows J. In a further aspect of this embodiment, the boom portions and/or carriage tracks can be telescoped inwardly as indicated by arrows K to further reduce the volume occupied by the system 400 in preparation for transportation and/or storage.

FIGS. 11A-11G illustrate a system 1100 that includes a restraint device 1150 configured to prevent or at least restrict motion of the aircraft 170 after capture, in accordance with representative embodiments of the present technology. In one representative embodiment, the system 1100 can include a support 110, e.g., a single support, having an upright portion 111, an upper boom portion 112 and a lower boom portion 113. The support 110 carries a capture line 130 in an arrangement generally similar to that discussed above with reference to FIG. 1. Accordingly, the capture line 130 can be attached to the support 110 at a first attachment point 132 and a second attachment point 134, and can pass around a series of pulleys 133 between the two attachment points. The capture line 130 includes an engagement region 131 into which the aircraft 170 is directed during a capture maneuver. An energy absorber 135 (e.g., including first and second elastic members 136a, 136b, such as bungees) absorbs energy imparted to the capture line 130 by the aircraft 170.

The restraint device 1150 is configured to halt, at least temporarily, the recoil motion that the aircraft 170 would otherwise undergo as the energy absorber 135 releases the energy initially absorbed during the capture operation. In a representative embodiment, the restraint device 1150 includes a restraint line 1156 coupled to the capture line 130. For example, the restraint line 1156 can be connected to, and extend transversely from, the capture line 130. In a particular embodiment, the restraint line 1156 is connected to the capture line 130 below the engagement region 131, e.g., to reduce any impact of the restraint line 1156 on the operation of successfully engaging the aircraft 170 with the engagement region 131. In other embodiments, the restraint line 1156 can be connected to the capture line at other locations.

Figure 11A:
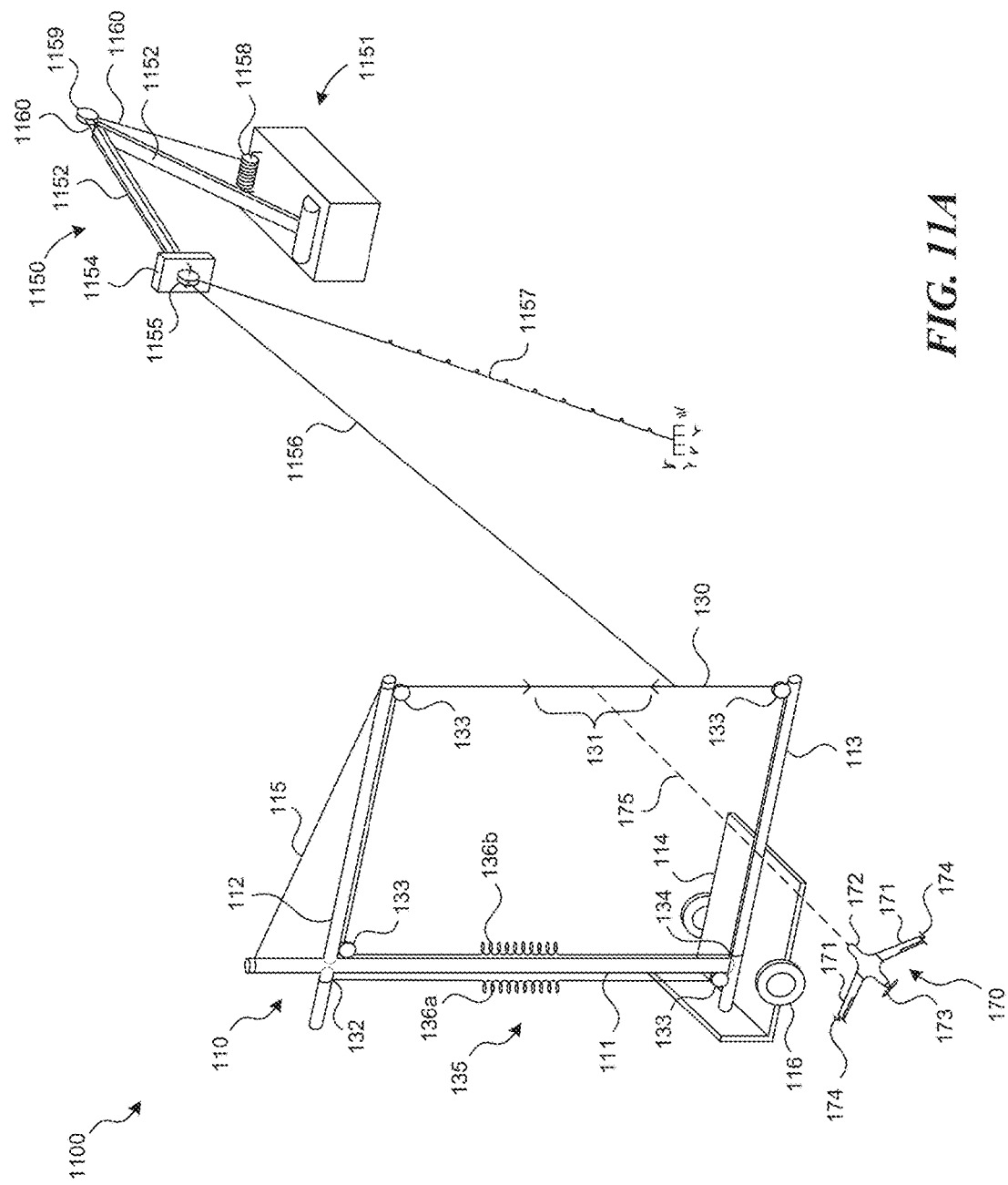
FIGS. 11A-11G are partially schematic, isometric illustrations of a system configured to restrain the motion of a captured UAV in accordance with representative embodiments of the present technology.

The restraint device 1150 can further include a restraint support 1151 that carries and guides the restraint line 1156. For example, the restraint support 1151 can carry one or more support arms 1152 (two of which are shown in FIG. 11A), which in turn support a restraint line pulley 1155, e.g., via a pulley bracket 1154. The bracket 1154 can carry a relatively stiff cushioning element (e.g., a spring) to absorb forces imparted by the restraint line pulley 1155, e.g., during a capture operation. The support arms 1152 can be adjusted to change the height and/or orientation of the restraint line 1156, e.g., to reduce interference between the capture line 130 and the restraint line 1156 and/or adjust the height of the aircraft 170 from the ground during capture. The restraint line 1156 passes around the restraint line pulley 1155 and is attached to a retraction member 1157. The restraint line pulley 1155 can include a releasable one-way or locking mechanism that, when engaged, allows the restraint line 1156 to pass around the pulley in one direction but not the other. The retraction member 1157 can include a spring or other elastic, resilient member that takes up slack in the restraint line 1156 during the capture operation. The retraction member 1157 can have a relatively low spring constant so as not to cause the capture line 130 to deviate significantly from the vertical position shown in FIG. 11A prior to the aircraft 170 engaging with the capture line 130.

The restraint device 1150 can also include a winch 1158 operatively coupled to the restraint line pulley 1155. For example, the winch 1158 can be attached to the pulley bracket 1154 via a winch line 1160 that is guided by one or more winch line pulleys 1159. The winch 1158 and winch line 1160 can hold the pulley bracket 1154 and restraint line pulley 1155 in the position shown in FIG. 11A prior to capture. After capture, the winch 1158 can be used to controllably release the energy absorbed by the energy absorber 135, and position the aircraft 170 for release from the capture line 130, as described further below with reference to FIGS. 11B-11D.

Figure 11B:
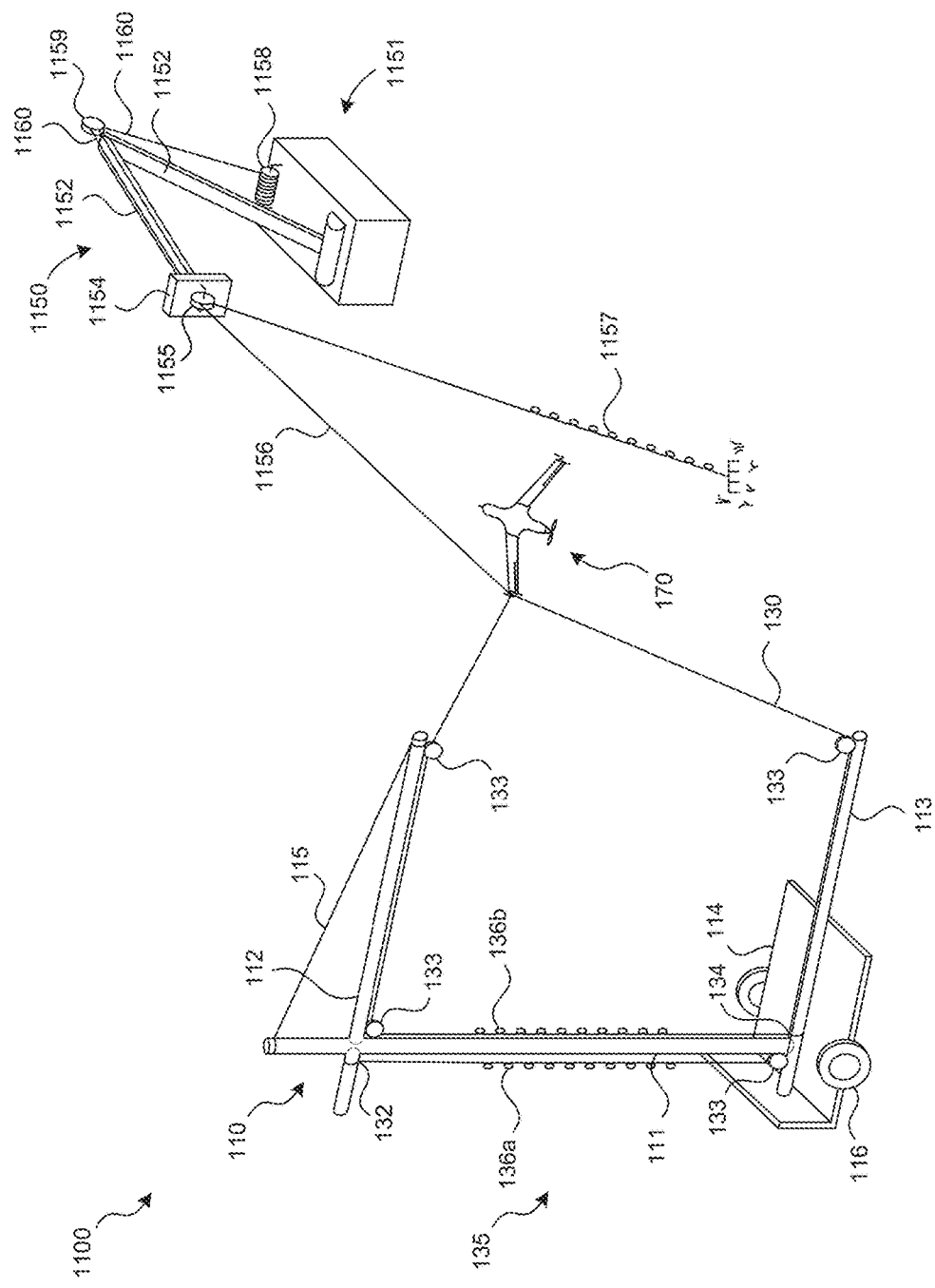

In FIG. 11B, the aircraft 170 has engaged the capture line 130, causing the capture line 130 to deflect laterally from the position shown in FIG. 11A. The energy absorber 135 begins to absorb the energy imparted to the capture line 130 by the aircraft 170, as indicated schematically by the stretched state of the elastic members 136a, 136b. As the aircraft 170 deflects the capture line 130 laterally, the retraction member 1157 pulls on the restraint line 1156 to take up slack in the restraint line 1156. Accordingly, the retraction member 1157 can have a strong enough retraction force to keep up with the motion of the captured aircraft 170, without overly deflecting the capture line 130 from its initial, generally vertical position, as discussed above with reference to FIG. 11A.

Figure 11C:
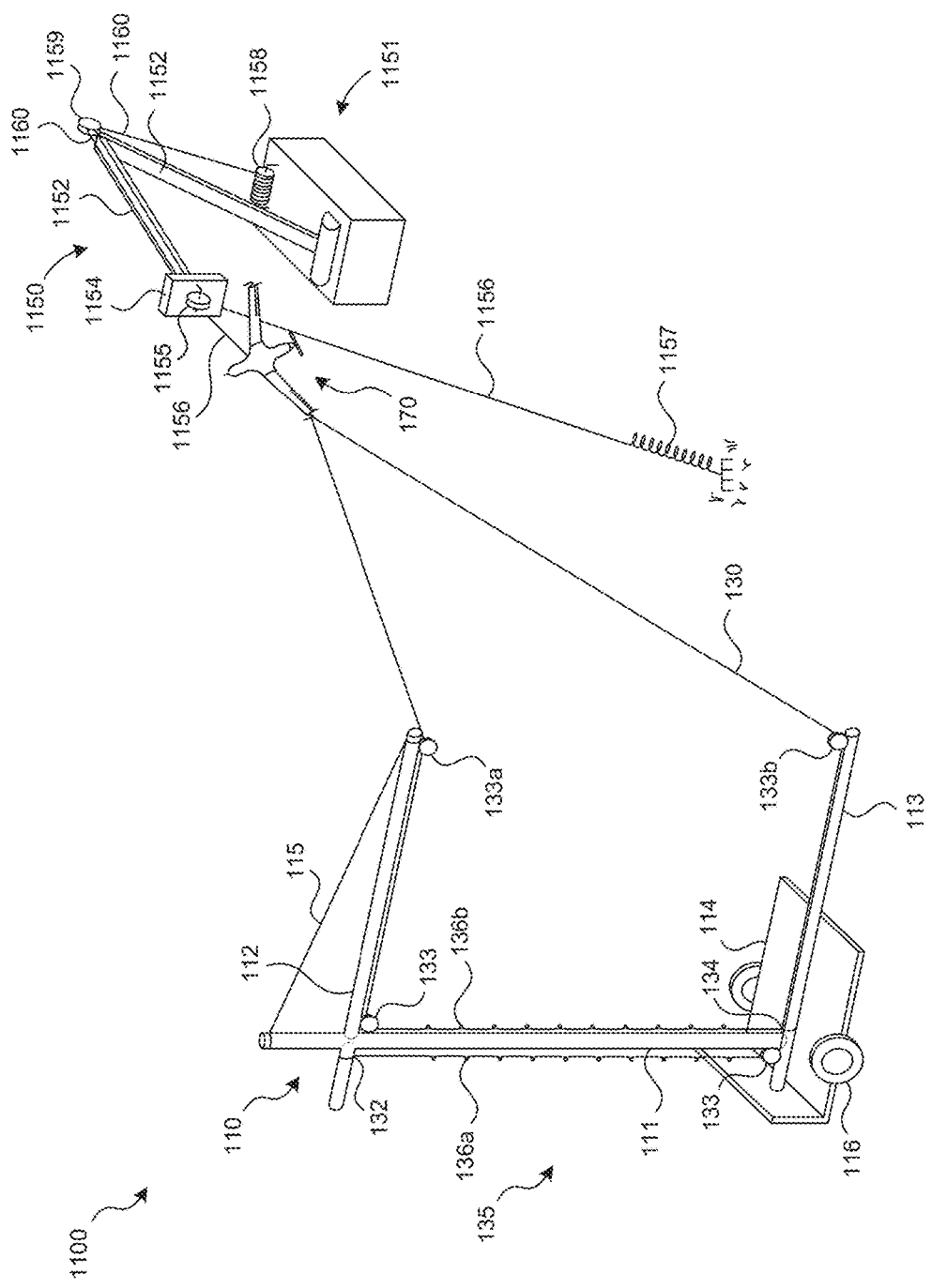

In FIG. 11C, the aircraft 170 has reached the end of its travel. The energy absorber 135 has reached its peak energy absorption point for the maneuver, and the locking pulley 1155 has locked the restraint line 1156, thereby preventing the capture line 130 from returning back to the generally vertical position shown in FIG. 11A. The retraction member 1157 has further retracted (e.g., to its maximum retracted state). However, because the restraint line pulley 1155 has locked the restraint line 1156, the retraction member 1157 is not providing the force required to keep the captured aircraft 170 in the position shown in FIG. 11C. Instead, the locking pulley 1155 and the restraint support 1151 counteract the force imparted by the energy absorber 135 to the capture line 130. In a particular aspect of this embodiment, one or more of the pulleys 133 carried by the support 110 can include releasable locking mechanisms. For example, the two pulleys at the ends of the upper and lower boom portions 112, 113 (identified by reference number 133a, 133b) can releasably lock onto the capture line 130 when the aircraft 170 reaches the end of its capture trajectory. This arrangement can significantly reduce the lateral forces on the support 110 when the captured aircraft 170 is in the position shown in FIG. 11C and the energy absorber 135 retains the absorbed capture energy, which would otherwise be applied to the laterally-extended capture line 130. This arrangement can also reduce the forces borne by the restraint device 1150

Figure 11D:
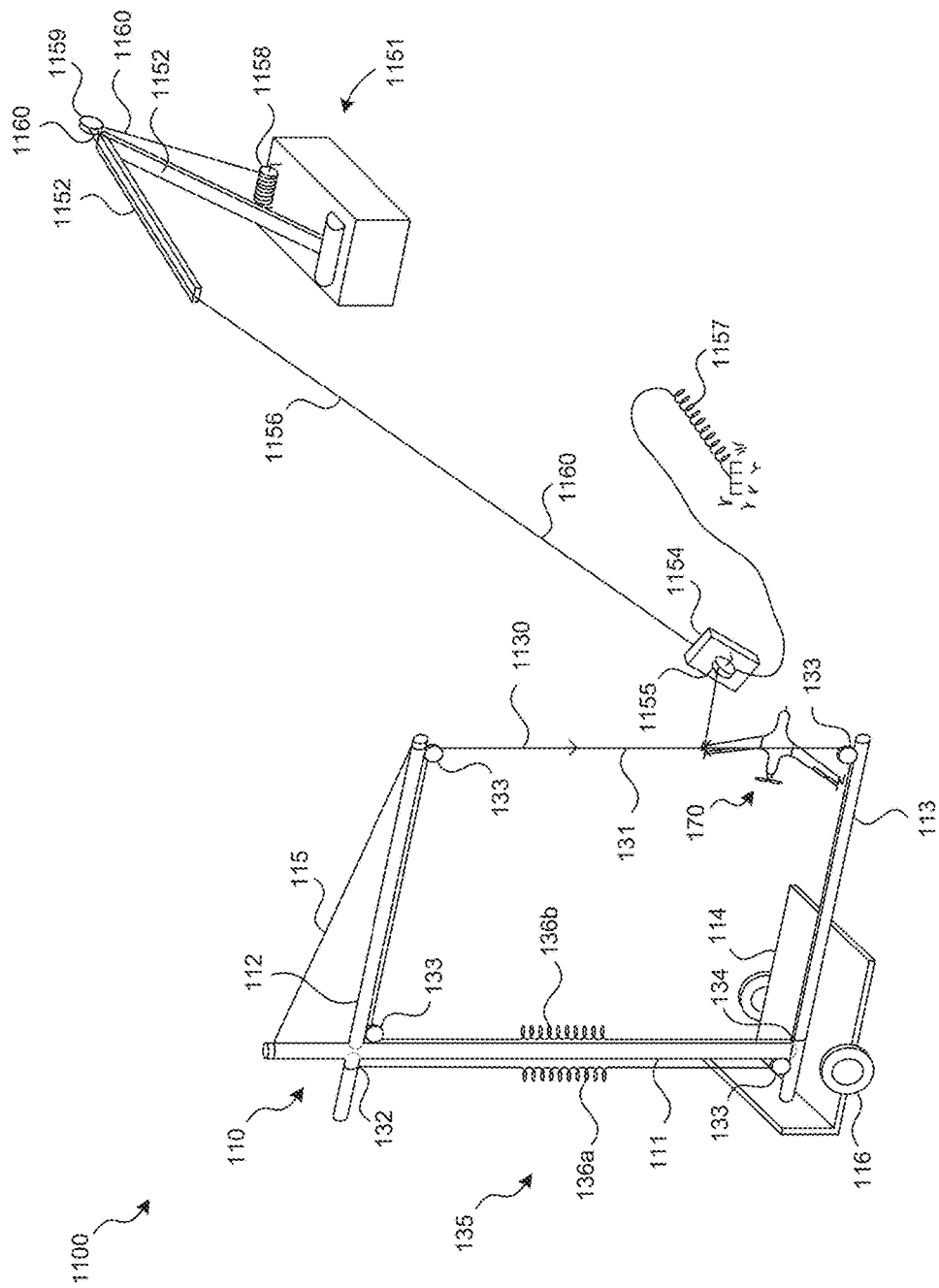

FIG. 11D illustrates a representative process for controllably releasing the energy stored by the energy absorber 135, and positioning the aircraft 170 so that it can be easily released from the capture line 130. In a particular aspect of this embodiment, the winch 1158 controllably pays out the winch line 1160, allowing the pulley bracket 1154 and the (still locked) restraint line pulley 1155 to move from a first position, toward the support 110 to a second position. As the restraint line pulley 1155 moves toward the support 110, the tension in the energy absorber 135 releases, so that the energy absorber 135 returns to the state shown in FIG. 11A. Once the capture line 130 returns to (or close to) its vertical position, and the winch line 1160 is slack (or approximately slack), the aircraft 170 can be readily removed from the capture line 130. As shown in FIG. 11D, the engagement region 131 of the capture line 130 is deliberately sized so that (a) the captured aircraft 170 does not touch the ground during the capture process, and (b) an operator can easily reach the captured aircraft 170 for release. If the aircraft 170 is too high for the operator to reach easily, the operator can use a lift to reach it, or the capture line 130 can be lowered.

Once the captured aircraft 170 is released from the capture line 130, the locking mechanism of the restraint line pulley 1155 is released, and the winch 1158 is activated to return the bracket 1154, the restraint pulley 1155, the restraint line 1156, and the retraction member 1157 to the configuration shown in FIG. 11A. The system 1100 is then ready for the next aircraft capture operation.

Figure 11E:
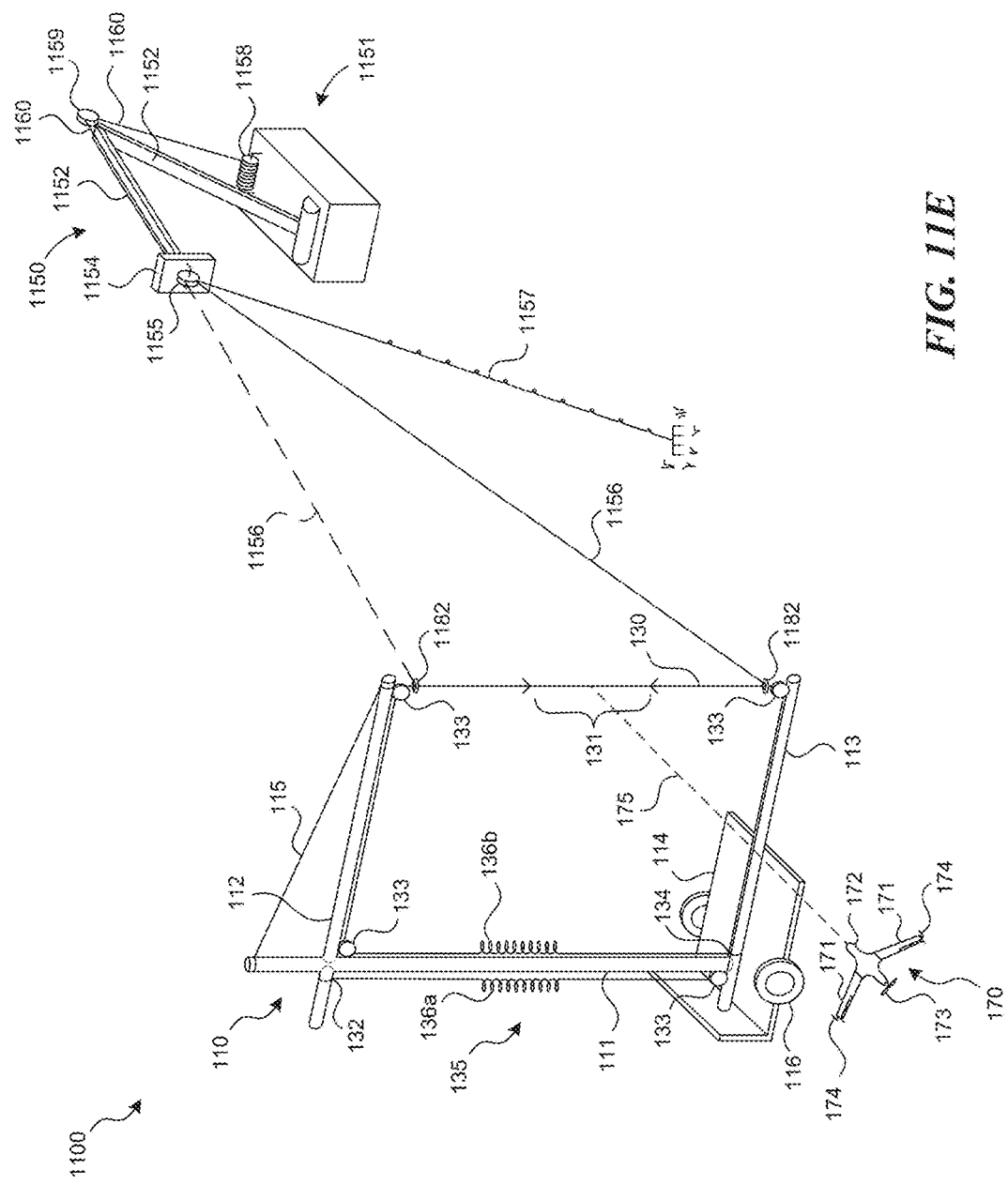
Figure 11F:
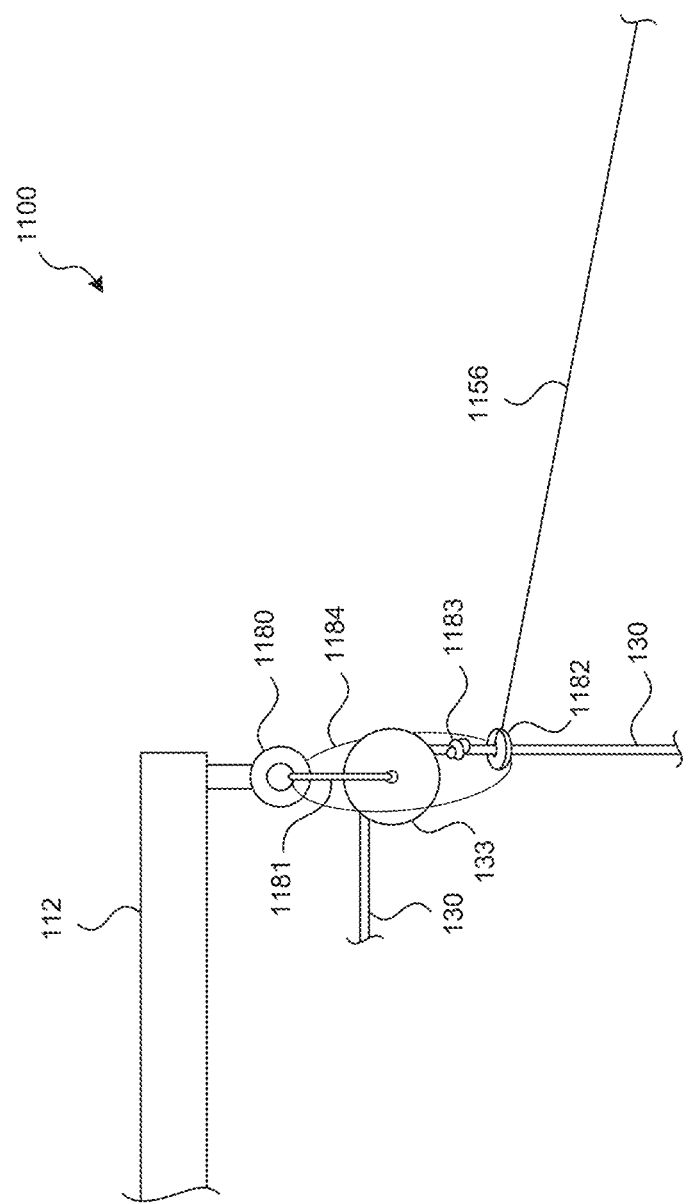
Figure 11G:
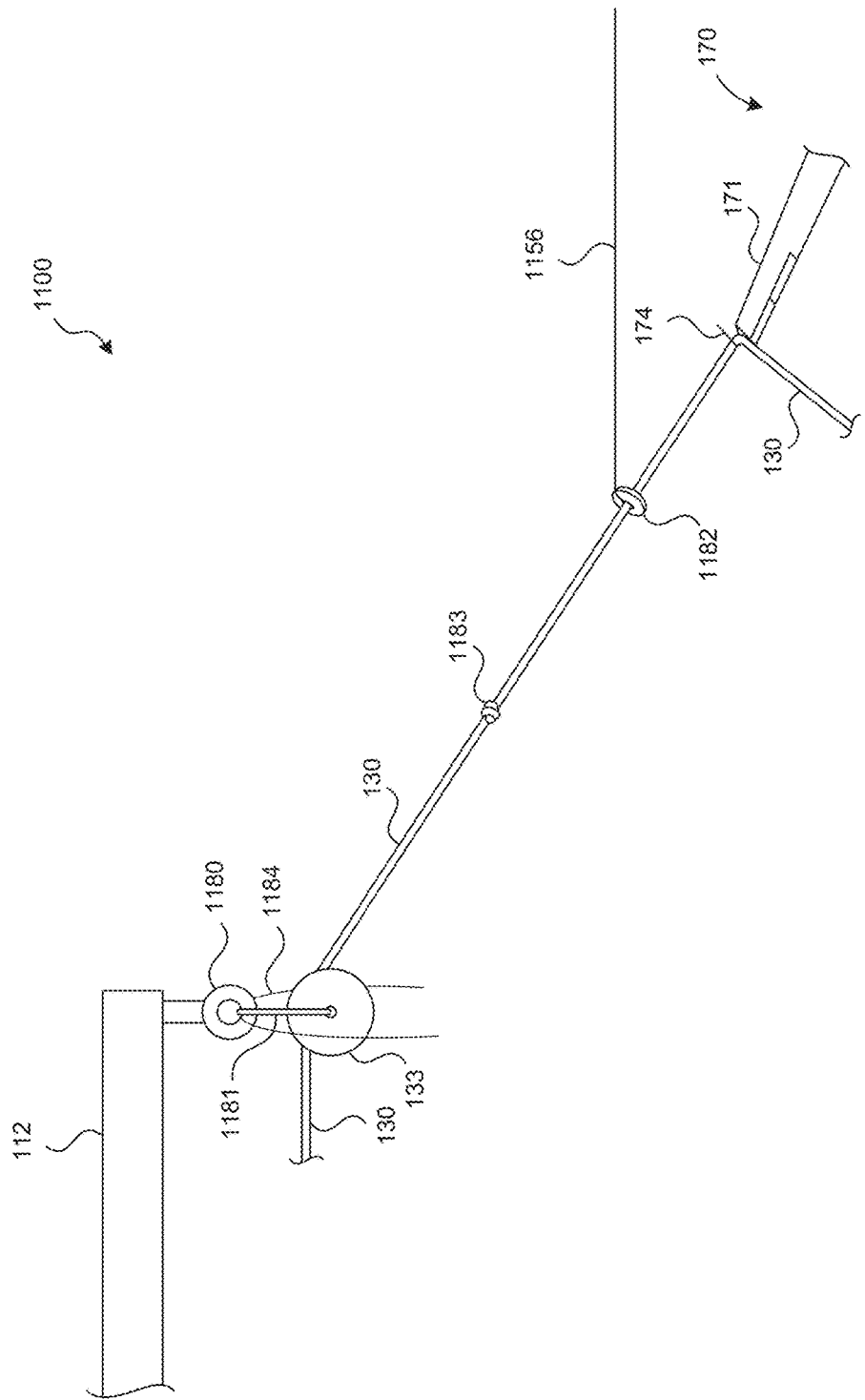

FIGS. 11E-11G illustrate an arrangement for controlling the motion of the restraint line 1156 using a slider 1182 in accordance with further embodiments of the present technology. FIG. 11E illustrates the restraint line connected to the capture line 130 below the engagement region 131. FIG. 11E also illustrates, in dashed lines, an embodiment in which the restraint line 1156 is attached to the capture line 130 with a slider 1182 positioned above the engagement region 131. Positioning the attachment between the restraint line 1156 and the capture line 130 a significant distance away from the engagement region 131 can reduce the likelihood for the restraint line 1156 to interfere with the capture of the aircraft 170. However, the tension in the restraint line 1156 may cause the slider 1182 to move toward the engagement region 131 before the aircraft 170 is captured. In particular, when the slider 1182 is positioned below the engagement region 131, the tension in the restraint line 1156 may cause the slider 182 to rise up along the capture line 130 toward the engagement region 131. When the slider 1182 is positioned above the engagement region 131, the tension in the restraint line 1156, possibly assisted by the force of gravity, can cause the slider 1182 to move downwardly toward the engagement region 131. Accordingly, the system 1100 can include an arrangement for temporarily holding the slider 1182 in position, until the aircraft 170 engages the capture line, as discussed in further detail below with reference to FIGS. 11F-11G.

Referring now to FIG. 11F, the upper pulley 133 can be supported relative to the upper support 112 by a pulley support 1180 and a corresponding support arm 1181. The pulley support 1180 can include an eye bolt, and the support arm 1181 can include a cable or bracket. A mechanical fuse 1184 is connected between the pulley support 1180 and the slider 1182 to hold the slider 1182 in position prior to capture. The capture line 130 can include an obstruction 1183 that is too large to pass through the opening in the slider 1182 through which the capture line 130 passes. Prior to capture, the mechanical fuse 1184 holds the slider 1182 in the position shown in FIG. 11F. During capture, the aircraft 170 (not visible in FIG. 11F) pulls on the capture line 130, causing the obstruction 1183 to apply a downward force on the slider 1182. The downward force causes the mechanical fuse 1184 to break, allowing the slider 1182 to move freely along the capture line 130.

FIG. 11G illustrates the system 1100 after the aircraft 170 has engaged the capture line 130. The force applied by the aircraft to the capture line 130 has caused the obstruction 1183 to engage with the slider 1182, causing the mechanical fuse 1184 to break. In a particular embodiment, the mechanical fuse 1184 can include a relatively weak zip tie, or other structure that is sufficient to hold the slider 1182 at rest, but which breaks under the force applied by the obstruction 1183 applied to the slider 1182. The force applied by the restraint line 1156 causes the slider 1182 to move along the capture line 130 toward the aircraft 170. When the system comes to rests, the slider 1182 will be positioned just above the engagement device 174 of the aircraft 170. If the slider 1182 is positioned initially below the engagement region 131 (as shown in FIG. 11E), a similar arrangement to that show in FIGS. 11F and 11G can be applied to the lower pulley 133 shown in FIG. 11E. The expected result of either arrangement is that the restraint line 1156 is positioned well out of the way of the engagement region 131 and the aircraft 170 until the aircraft 170 has been successfully captured.

One feature of at least some of the foregoing embodiments described above with reference to FIGS. 11A-11G is that the restraint device 1150 can operate to control the motion of the aircraft 170 as it undergoes the capture operation. By doing so, the aircraft 170 is less likely to contact or interfere with the capture line 130, other than via the intended contact with the engagement device 174. In addition, the aircraft 170 is less likely to undergo sudden decelerations, and/or collisions with surrounding equipment or the ground, and therefore can significantly lengthen the useful life of the aircraft 170.

Figure 12A:
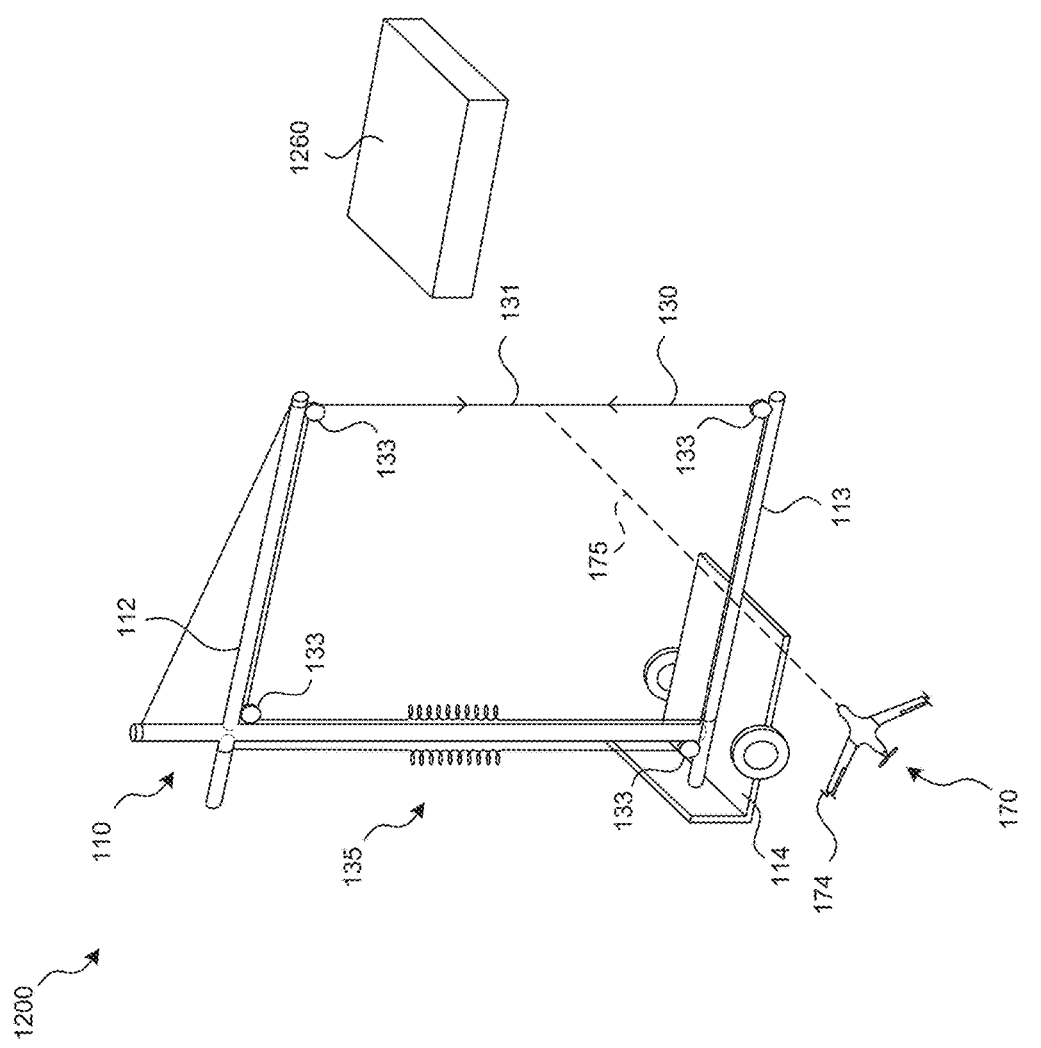
FIGS. 12A-12G illustrate a system having a flexible, resilient landing device positioned to receive a UAV during a capture operation, in accordance with representative embodiments of the present technology.

FIGS. 12A-12G schematically illustrate a system 1200 having a landing device (e.g., a flexible, resilient landing device) 1260 positioned to cushion the impact of the aircraft 170 after it is engaged with the capture line 130. FIG. 12A is an isometric illustration of the aircraft 170 approaching the system 1200, which includes a single support 110 having a configuration generally similar to that described above with reference to FIG. 1. The landing device 1260 is positioned generally along the flight path 175 past the support 110. In general, the landing device 1260 is positioned below the engagement portion 131 of the capture line 130 so as to be below the aircraft 170 when the aircraft 170 engages with the capture line 130.

Figure 12B:
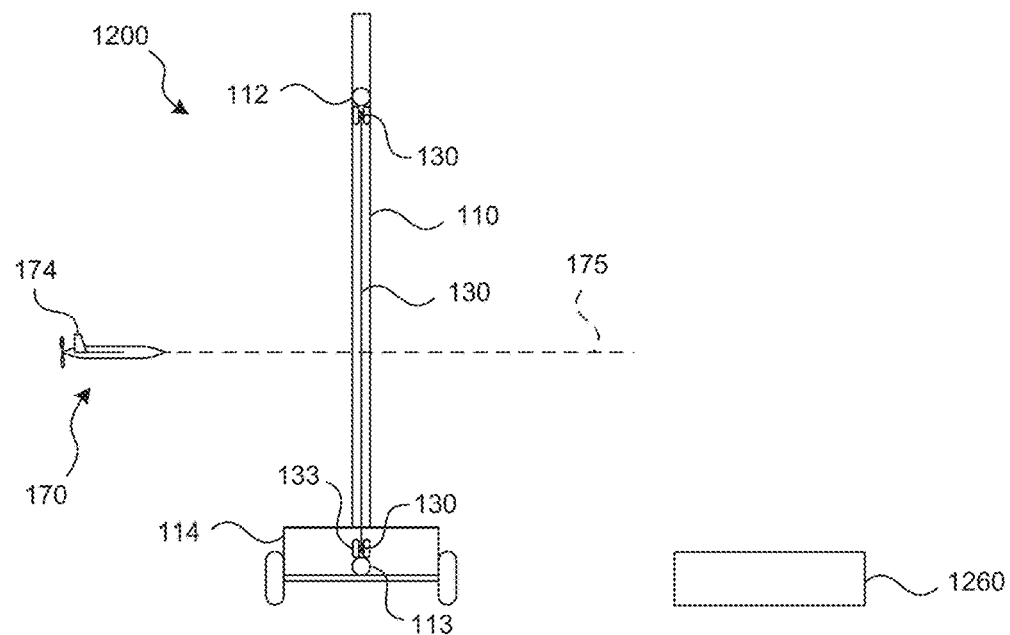

FIG. 12B is a simplified side view of the aircraft 170 as it approaches the capture line 130. For purposes of clarity, the energy absorber device 135 shown in FIG. 12A is not shown in FIG. 12B. As shown in FIG. 12B, the landing device 1260 is positioned a selected distance beyond the capture line 130 along the flight path 175, so as to receive the aircraft 170 at the end of the capture operation.

Figure 12C:
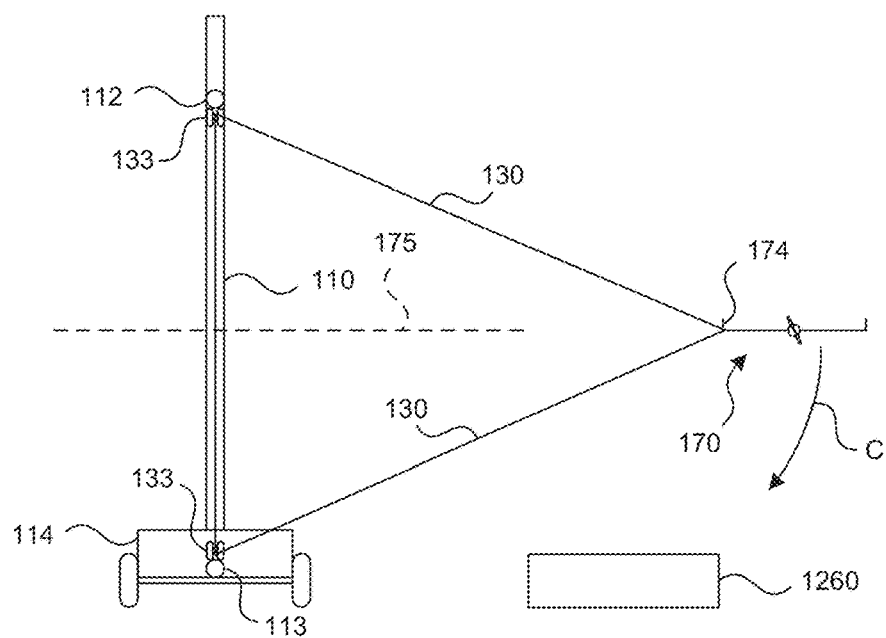
Figure 12D:
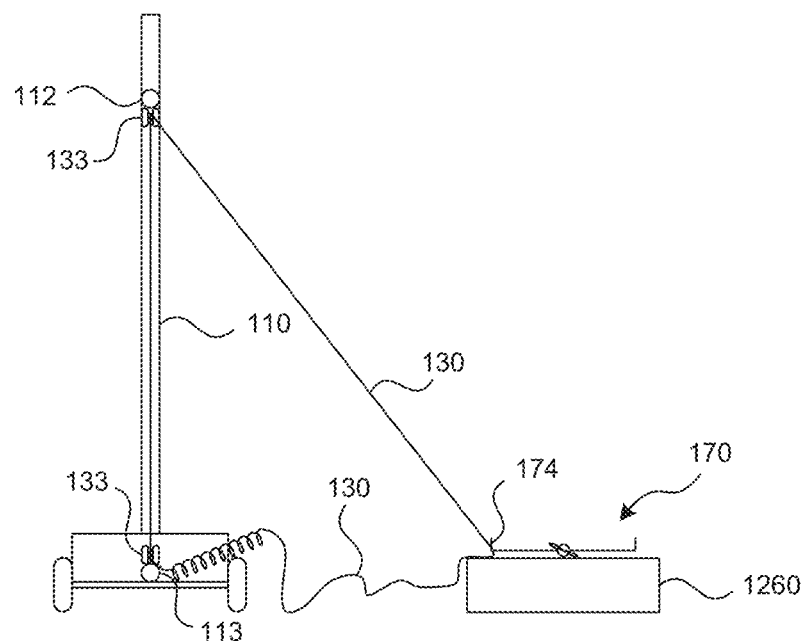

In FIG. 12C, the aircraft 170 has engaged with the capture line 130 and pulled the capture line 130 laterally along the flight path 175. Each of the pulleys 133 around which the capture line 130 passes can include a restraint device, for example, a lock or ratchet that allows the pulleys 133 to rotate in the direction required to facilitate extending the capture line 130 to the position shown in FIG. 12C, and resist or prevent the capture line 130 from moving in the opposite direction. Accordingly, the restraint device can lock the motion of the capture line 130 when the aircraft 170 is in the position shown in FIG. 12C. At that point, the aircraft 170 falls towards the landing device 1260 along an arc C defined by the length of the capture line 130 between the aircraft 170 and the upper boom portion 112. In FIG. 12D, the aircraft 170 has come to rest on the landing device 1260 and is ready to be released from the capture line 130.

The landing device 1260 can be particularly configured to reduce or eliminate the likelihood of damage to the aircraft 170 as it lands. For example, referring now to FIG. 12E, the landing device 1260 (shown in plan view) can include a recess, receptacle, concave region or depression that restricts and/or cushions lateral motion of the aircraft 170 as it comes to rest. For example, the landing device 1260 can include a generally circular or elliptical depression 1261a (shown in dashed lines) that performs this function. In another embodiment, for example, where the position and orientation of the aircraft 170 is reliably repeatable from one capture to the next, a representative depression 1261b (shown in solid lines) can have a shape that corresponds to the shape and orientation of the aircraft when it impacts the landing device 1260.

Figure 12E:
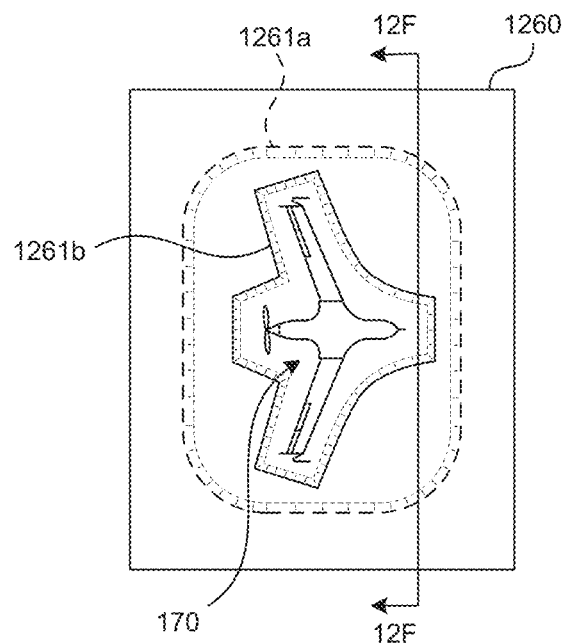
Figure 12F:
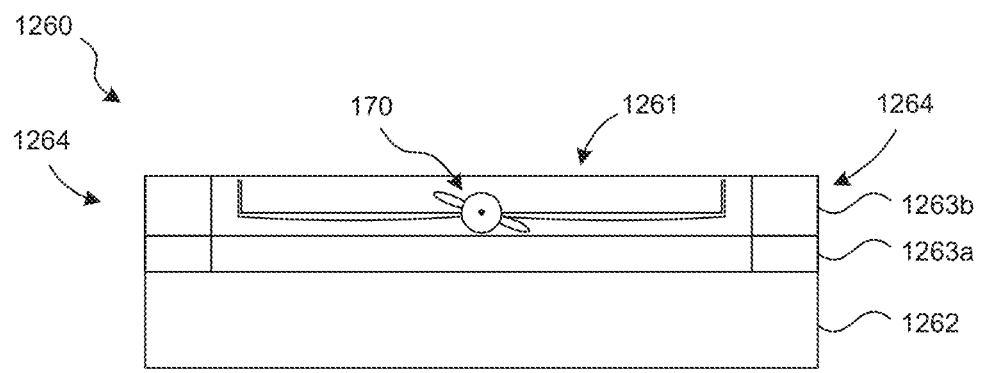

FIG. 12F is a partially schematic, cross-sectional illustration of the landing device 1260, taken generally along line 12F-12F of FIG. 12E. As shown in FIG. 12F, the landing device 1260 can include a base 1262 and sidewalls 1264 that surround or at least partially surround a concave region 1261. In a particular embodiment, the sidewalls 1264 can include multiple portions, e.g., a first portion 1263a and a second portion 1263b. The first portion 1263a can have one composition, and the second portion 1263b can have another. In a particular embodiment, the first portion 1263a can be inflatable and can include one or more gas (e.g., air) bladders. The second portion 1263b can include foam or another compressible resilient material. The base 1262 can also include a compressible material, e.g., a foam or gas filled bladder.

Figure 12G:
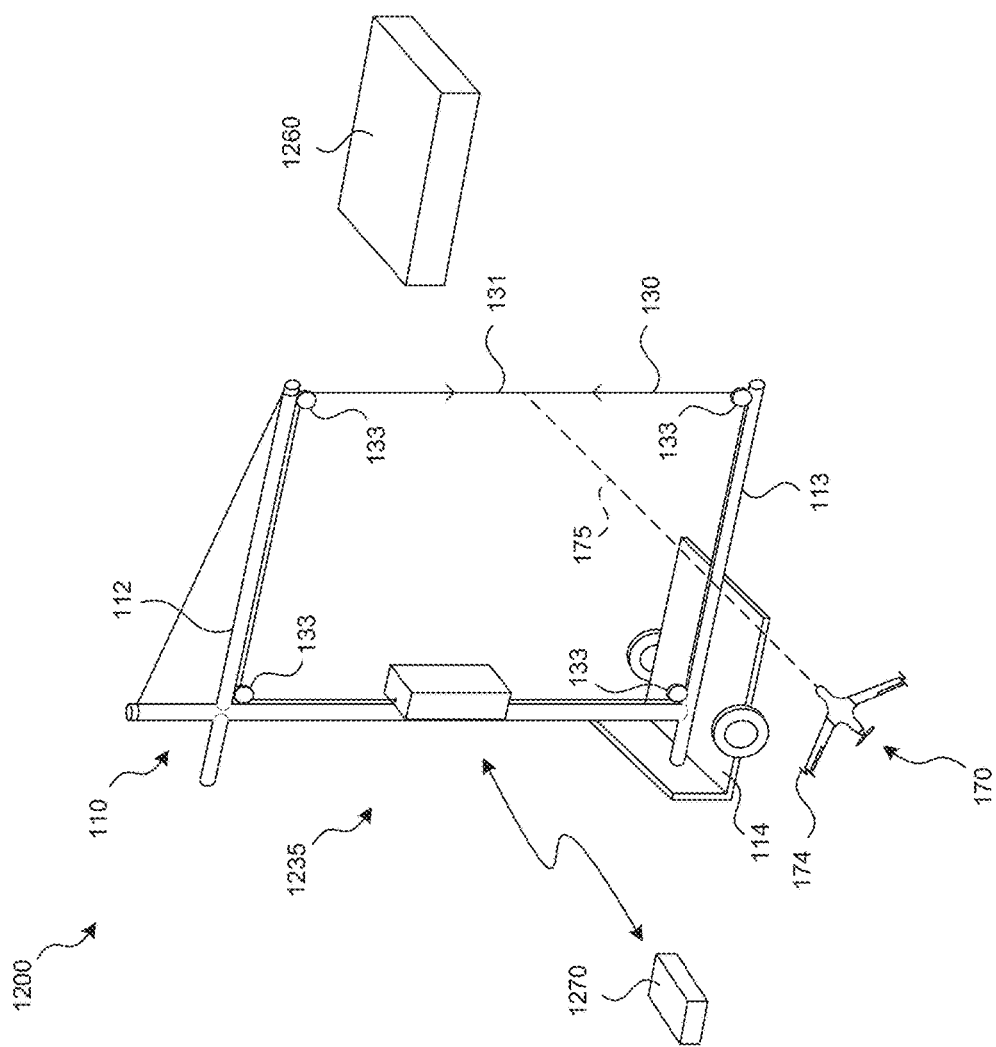

FIG. 12G is a partially schematic illustration of a system 1200 adding an energy absorber device 1235 configured in accordance with another embodiment of the present technology. In one aspect of this embodiment, the energy absorber device 1235 can communicate with a controller 1270 (e.g., a computer-based controller) to adjust the manner in which the energy absorber device 1235 absorbs energy resulting from the impact between the UAV 170 and the capture line 130. For example, in particular embodiments, the energy absorber device 1235 can include a computer-controlled break that applies a varying breaking force to the capture line 130 as the aircraft engages with the capture line 130. By varying the breaking force applied by the energy absorber device 1235, the system 1200 can accommodate aircraft having different sizes, weights, and/or velocities. In particular, the landing device 1260 may be positioned a selected distance away from the support 110 and the capture line 130. If the momentum of the aircraft 170 can vary from one aircraft to another, and/or one flight to another, the distance the aircraft 170 travels once captured may vary as well. As a result, the aircraft may overshoot or undershoot the landing device 1260. The energy absorber device 1235, in particular, when coupled to the controller 1270, can address this potential issue. In particular, the controller 1270 can receive data from the aircraft 170 and/or other sources, indicating the weight and velocity of the aircraft. The controller 1270 can use that information to determine the breaking force as a function of time to be applied to the capture line 130 such that the aircraft is directly over the landing device 1260 when its forward progress stops. In a particular embodiment, the break can include the wheel or a series of wheels that provide a variable resistant force on the capture line 130, so as to vary the breaking force from one capture operation to another, and/or during the course of an individual capture operation. An advantage of the foregoing arrangement is that it can allow aircraft having a variety of weights and velocities to use a single capture device 1200 without the need to make manual adjustments to the capture device 1200.

One feature of at least some of the foregoing embodiments described above with reference to FIGS. 12A-12G is that they can be relatively simple to implement. For example, the landing device 1260 can be largely inflatable and accordingly can be easily collapsed for storage. In addition, the landing device 1260 can have a simple mechanical construction that may be less susceptible to wear and fatigue. Conversely, embodiments of the present technology described above with reference to FIGS. 1-11D do not require an impact between the captured aircraft and a landing device, and accordingly, may have a reduced tendency for incidental damage that can potentially result from such contact.

From the foregoing, it will be appreciated that specific embodiments of the technology have been described herein for purposes of illustration, but that various modifications may be made without deviating from the disclosed technology. For example, in particular embodiments, the foregoing energy absorbers can include bungee lines or other flexible and stretchable elements, and in other embodiments, suitable energy absorbers can include a line wound on a wheel that includes a resistive element to absorb energy, and/or a ratchet mechanism to prevent the line from rewinding or otherwise recoiling until the device is to be reset. Embodiments of the restraint device described above with reference to FIGS. 11A-11D can include an articulating arrangement of support arms 1152. In other embodiments, the restraint device can have a fixed support arm. The aircraft captured by any of the foregoing devices can have the shape and configuration shown in FIG. 1 in particular embodiments, and can have other arrangements in other embodiments. Certain aspects of the technology described in the context of particular embodiments may be combined or eliminated in other embodiments. For example, the triangular arrangement described above with reference to FIGS. 4-10C can include a flexible carriage track generally similar to that described above with reference to FIG. 1. A ratchet or other motion resistor that is carried by the carriage track (as discussed in the context of FIG. 8B) can be applied to embodiments other than those described with reference to FIG. 8B. Depending upon the embodiment, representative systems can include a carriage track and no restraint device, a restraint device and no carriage track, both a restraint device and a carriage track, or neither a restraint device nor a carriage track. Particular embodiments can include a flexible landing device, with or without a restraint device. Other embodiments can include flexible landing and one or more carriage tracks. The pivoting arrangement described above with reference to FIG. 2D can be applied to other arrangements in other embodiments, e.g., the arrangements described above with reference to FIGS. 4-10B. Aspects of the collapsing arrangement described above with reference to FIGS. 9A-10B can be applied to other arrangements in other embodiments, e.g., the arrangements described above with reference to FIGS. 1-3 and 11A-12F. Further, while advantages associated with certain embodiments of the technology have been described in the context of those embodiments, other embodiments may also exhibit such advantages, and not all embodiments need necessarily exhibit such advantages to fall within the scope of the present technology. Accordingly, the present disclosure and associated technology can encompass other embodiments not expressly shown or described herein.

To the extent any of the materials incorporated herein by reference conflict with the present disclosure, the present disclosure controls.

We claim:

1. An aircraft system, comprising:
   at least one support having an upright portion and at least one boom portion;
   a capture line carried by and extending downwardly relative to the at least one boom portion; and
   a releasable restraint device coupled to the capture line to allow motion of the capture line in a first direction and to prevent motion of the capture line in a second direction opposite the first direction, wherein the restraint device includes a ratchet and a restraint line, the restraint line connected to the capture line.

2. The system of claim 1 wherein the ratchet is operatively coupled to the restraint line.

3. The system of claim 1, further comprising:
   a carriage track carried by the at least one boom portion; and
   a carriage carried by and movable along the carriage track.

4. The system of claim 3, wherein the restraint device is carried by and movable with the carriage.

5. The system of claim 3 wherein the restraint line is carried by the carriage.

6. The system of claim 3 wherein the capture line includes an engagement region positioned to engage with an engagement member of an aircraft, and wherein the restraint line is connected between the carriage and the capture line, the restraint line being connected to the capture line at a location above the engagement region.

7. An aircraft system, comprising:
   at least one support having an upright portion and at least one boom portion;
   a capture line carried by and extending downwardly relative to the at least one boom portion; and
   a releasable restraint device coupled to the capture line to allow motion of the capture line in a first direction and to prevent motion of the capture line in a second direction opposite the first direction, the restraint device including:
   a restraint line connected to the capture line;
   a restraint support;
   a locking pulley carried by the restraint support; and
   a retraction member, wherein the restraint line is connected to the retraction member and engaged with the locking pulley between the capture line and the retraction member.

8. The system of claim 7 wherein the locking pulley is releasably carried by the restraint support, and wherein the restraint device further includes a winch coupled to the locking pulley to allow the locking pulley to move between a first position and a second position relative to the restraint support.

9. A method for arresting an unmanned aircraft in flight, comprising:
   releasably engaging the unmanned aircraft with a downwardly extending, flexible capture line;
   allowing motion of the capture line in a first direction as the unmanned aircraft decelerates;
   preventing motion of the capture line in a second direction opposite the first direction, wherein the capture line is attached to a restraint line, and wherein preventing motion includes preventing motion of the restraint line; and
   releasing the unmanned aircraft from the capture line.

10. The method of claim 9 wherein preventing motion of the capture line includes engaging a ratchet with a pulley about which the capture line passes.

11. The method of claim 9 wherein preventing motion of the capture line includes engaging a ratchet with a pulley about which the restraint line passes.

12. The method of claim 9, further comprising:
    absorbing energy imparted to the capture line by the unmanned aircraft; and
    releasing at least a portion of the energy before releasing the unmanned aircraft from the capture line.

* * * * *